United States Patent
Li et al.

(10) Patent No.: US 11,327,325 B2
(45) Date of Patent: May 10, 2022

(54) OPTICAL BEAM FORMER

(71) Applicant: Fraunhofer-Gesellschaft zur Förderung der angewandten Forschung e.V., Munich (DE)

(72) Inventors: Chen Li, Jena (DE); Peter Schreiber, Jena (DE); Dirk Michaelis, Jena (DE); Christoph Wächter, Jena (DE); Stephanie Fischer, Jena (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 216 days.

(21) Appl. No.: 16/825,064

(22) Filed: Mar. 20, 2020

(65) Prior Publication Data
US 2020/0218077 A1 Jul. 9, 2020

Related U.S. Application Data

(63) Continuation of application No. PCT/EP2018/076355, filed on Sep. 27, 2018.

(30) Foreign Application Priority Data

Sep. 28, 2017 (DE) ...................... 10 2017 217 345.9

(51) Int. Cl.
G02B 27/09 (2006.01)
G02B 3/00 (2006.01)

(52) U.S. Cl.
CPC ....... *G02B 27/0961* (2013.01); *G02B 3/0056* (2013.01); *G02B 27/0905* (2013.01)

(58) Field of Classification Search
CPC ............ G02B 27/0961; G02B 3/0056; G02B 3/0043; G02B 3/0062; G02B 3/0068; G02B 27/0905
See application file for complete search history.

(56) References Cited

U.S. PATENT DOCUMENTS

| 4,851,882 A | 7/1989 | Takahashi et al. |
| 5,650,876 A | 7/1997 | Davies et al. |

(Continued)

FOREIGN PATENT DOCUMENTS

| DE | 19755565 A1 | 6/1998 |
| DE | 102006047941 A1 | 4/2008 |

(Continued)

OTHER PUBLICATIONS

International Search Report and written opinion, dated Sep. 27, 2018 from PCT/EP2018/076355.

(Continued)

*Primary Examiner* — Ryan D Howard
(74) *Attorney, Agent, or Firm* — McClure, Qualey & Rodack, LLP

(57) ABSTRACT

Optical beam former for generating an emerging light beam from an incident light beam, the optical beam former including: a condenser lens array including several condenser lenses; and a projection lens array arranged in parallel to the condenser lens array and including several projection lenses; wherein exactly one of the projection lenses is assigned to each of the condenser lenses so that several optical channels are formed and so that each of the several optical channels generates a partial light beam of the emerging light beam, said partial light beam emerging in an angle-of-emergence range with a partial intensity distribution that is homogenous with respect to an angle of emergence, from an incident partial light beam, wherein the admissible angle-of-incidence ranges of the optical channels have the same size as to the magnitude in a plane extending in parallel to the optical axes of the condenser lenses; and wherein the angle-of-emergence ranges of at least two of the optical channels are different so that an intensity distribution with respect to the angle of emergence includes several regions (Continued)

having a homogenous intensity in a far field of the emerging light beam.

25 Claims, 16 Drawing Sheets

(56) References Cited

U.S. PATENT DOCUMENTS

| | | | |
|---|---|---|---|
| 5,822,125 | A | 10/1998 | Meyers |
| 5,963,305 | A | 10/1999 | Mizouchi |
| 10,288,774 | B2 | 5/2019 | Kaneda |
| 2004/0067015 | A1 | 4/2004 | Nakajima |
| 2010/0033829 | A1 | 2/2010 | Wippermann et al. |
| 2012/0194794 | A1 | 8/2012 | Tychkov et al. |
| 2016/0182871 | A1 | 6/2016 | Kurashige |
| 2016/0265740 | A1 | 9/2016 | Booij et al. |

FOREIGN PATENT DOCUMENTS

| | | |
|---|---|---|
| DE | 102008036569 A1 | 10/2009 |
| DE | 102009032939 A1 | 1/2011 |
| EP | 0 563 874 A1 | 10/1993 |
| GB | 654175 A | 6/1951 |
| JP | 2004126360 A | 4/2004 |
| JP | 2015057765 A | 3/2015 |
| JP | 63012135 A | 1/2018 |
| KR | 10-2011-0004276 A | 1/2011 |
| WO | 94/22040 A1 | 9/1994 |
| WO | 2011/006710 A2 | 1/2011 |
| WO | 2014/119237 A1 | 8/2014 |
| WO | 2019063733 A1 | 4/2019 |

OTHER PUBLICATIONS

English Translation of International Search Report, dated Sep. 27, 2018 from PCT/EP2018/076355.

Written Opinion, dated Dec. 9, 2019.

Enrico Geißler, "Meeting the Challenges of Developing LED-based Projection Displays", SPIE 6169 (2006) 619601.

Peter Schreiber, Sergey Kudaev, Peter Dannberg, Uwe D. Zeitner, "Homogeneous LED-illumination using microlens arrays", SPIE 5942 (2005) 188-96.

Julius Muschaweck, "Randomized Micro Lens Arrays for Color Mixing", SPIE 7954 (2011) 79540A.

Marcel Sieler, Peter Schreiber, Peter Dannberg, Andreas Brauer, Andreas Tunnermann, "Ultraslim fixed pattern projectors with inherent homogenization of illumination", Appl. Opt. 51 (2012) 64-74.

Japanese Office Action, dated Mar. 26, 2021, in parallel patent application No. 2020-518051.

English Translation of Japanese Office Action, dated Mar. 26, 2021, in parallel patent application No. 2020-518051.

Chinese language office action dated Dec. 3, 2021, issued in application No. CN 201880076833.2.

English language translation of office action dated Dec. 3, 2021, issued in application No. CN 201880076833.2.

European language office action dated Mar. 14, 2022, issued in application No. EP 18 788 677.5.

Korean language office action dated Feb. 28, 2022, issued in application No. KR 10-2020-7011357.

English language translation of Korean language office action dated Feb. 28, 2022, issued in application No. KR 10-2020-7011357 (pp. 1-9 of attachment).

OPTICAL BEAM FORMER

CROSS-REFERENCES TO RELATED APPLICATIONS

This application is a continuation of copending international Application No. PCT/EP2018/076355, filed Sep. 27, 2018, which is incorporated herein by reference in its entirety, and additionally claims priority from German Application No. DE 10 2017 217 345.9, filed Sep. 28, 2017, which is incorporated herein by reference in its entirety.

BACKGROUND OF THE INVENTION

Diffusion disks (diffusers) are used to generate a continuous intensity distribution of a light beam. Based on a collimated or weakly divergent irradiation, these elements generate a defined angle distribution of the output cone (scattering lobe) at the smallest structural space requirements. The functionality is based on light scattering (volume scattering or surface scattering), refraction of light ("engineered" diffusers) and/or diffraction of light (holographic diffusers) at single-side structured micro-optics.

Diffusion disks conserve the cone area, however, increase the cone divergence by the aperture angle of the scattering lobe, leading to a decrease in luminance at the output, compared to the irradiation. This behavior is of disadvantage in applications needing a high luminance. For example, such applications are the illumination of micro-imagers or the realization of high-performance spotlights.

In order to describe geometrical aspects of illumination systems that are relevant in this regard, the following étendue is introduced:

$$\hat{E} = \pi n^2 A \sin^2 \theta \quad (1)$$

having the refractive index of the medium n, the surface area of the cone A and the aperture half-angle θ. Ideally imaging optics conserve the étendue, whereas faulty imaging and scattering elements increase the étendue. Increasing the étendue, as is typical for diffusers, causes a decrease in luminance at the output of the system, which is of disadvantage in particular for the above mentioned applications. The significance of the étendue is described in more detail in [1].

A further problem of diffusion disks is the strong dependence of the output cone on the irradiation direction, determining the orientation of the scattering lobe at the output. Thus, if the orientation of the scattering lobe is not exactly defined for diffusion disks, this does not lead to a reproducible output-side intensity distribution.

Honeycomb condensers known from reference [2] consists of two identical lens arrays arranged in the distance of a focal length. The lenses on the input-side lens array and the lenses on the output-side lens array are configured in the same way. In this case, an optical channel is formed by an input-side lens and an output-side lens each. Such honeycomb condensers are independent of the irradiation direction if the irradiation angle is smaller than or equal to the so-called angle of acceptance, and are additionally étendue-maintaining if the irradiation angle is equal to the so-called angle of acceptance. Such honeycomb condensers generate an emerging light beam whose intensity distribution is homogenous within an angle-of-emergence range and is zero outside of the angle-of-emergence range. Such an intensity distribution is also referred to as top-hat-shaped intensity distribution. However, more complex intensity distributions are not possible with such honeycomb condensers.

A modified honeycomb condenser is known from reference [3], wherein the input-side lens and the output-side lens in each of the optical channels are configured in the same way. However, the lenses of different optical channels differ from each other with respect to their size. By a special arrangement of the optical channels with the different lenses, an approximately bell-shaped intensity distribution of the emerging light beam is possible. However, the angle of acceptance in such honeycomb condensers is significantly smaller than in the classic honeycomb condenser.

In order to increase the angle of acceptance, reference [4] proposes a further modified honeycomb condenser comprising a spatially structured diaphragm array. However, the diaphragm array leads to a significantly lower mean luminance at the output of the honeycomb condenser.

SUMMARY

An embodiment may have an optical beam former for generating an emerging light beam from an incident light beam, the optical beam former having: a condenser lens array for receiving the incident light beam, comprising several condenser lenses, wherein the condenser lenses each comprise an aperture and an optical axis, wherein the optical axes of the condenser lenses extend in parallel to each other; and a projection lens array for radiating the emerging light beam, arranged in parallel to the condenser lens array and comprising several projection lenses, wherein the projection lenses each comprise an aperture with a center, and an optical axis; wherein exactly one of the projection lenses is assigned to each of the condenser lenses so that each of the condenser lenses and the respectively assigned projection lens form an optical channel of several optical channels and so that each of the several optical channels generates a partial light beam of the emerging light beam, said partial light beam emerging in an angle-of-emergence range with a partial intensity distribution that is homogenous with respect to an angle of emergence, from a partial light beam of the incident light beam, said partial light beam being incident within an admissible angle-of-incidence range of the respective optical channel, wherein the admissible angle-of-incidence ranges of the optical channels comprise the same size as to their magnitude in a plane extending in parallel to the optical axes of the condenser lenses; and wherein the angle-of-emergence ranges of at least two of the optical channels are different so that an intensity distribution with respect to the angle of emergence comprises in a far field of the emerging light beam several regions comprising a homogenous intensity.

Another embodiment may have an optical beam former arrangement for generating an emerging light beam from an incident light beam, wherein the beam former arrangement has inventive first and second optical beam formers, wherein the first optical beam former and the second optical beam former are arranged along a mutual plane, and wherein the intensity distribution of the first optical beam former and the intensity distribution of the second optical beam former are different.

Another embodiment may have an optical beam former arrangement for generating an emerging light beam from an incident light beam, wherein the beam former arrangement has inventive first and second optical beam formers, wherein the first optical beam former and the second optical beam former are arranged such that at least a part of the emerging light beam of the first optical beam former is provided to the second optical beam former as its incident light beam.

Another embodiment may have an optical system for generating a focused emerging light beam from an incident light beam, wherein the optical system has an inventive optical beam former and a collecting optic for focusing the emerging light beam of the optical beam former onto a plane.

Another embodiment may have an optical system for generating a focused emerging light beam from an incident light beam, wherein the optical system has an inventive optical beam former and a diverging optic for increasing a divergence of the emerging light beam of the optical beam former.

Another embodiment may have an optical system for generating an emerging light beam from an incident light beam, wherein the optical system has an inventive optical beam former arrangement and a collecting optic for focusing the emerging light beam of the optical beam former arrangement onto a plane.

Another embodiment may have an optical system for generating an emerging light beam from an incident light beam, wherein the optical system has an inventive optical beam former arrangement and a diverging optic for increasing a divergence of the emerging light beam of the optical beam former arrangement.

The invention proposes an optical beam former for generating an emerging light beam from an incident light beam, the optical beam former including:

a condenser lens array for receiving the incident light beam, comprising several condenser lenses, wherein the condenser lenses each comprise an aperture and an optical axis, wherein the optical axes of the condenser lenses extend in parallel to each other; and a projection lens ray for radiating the emerging light beam, arranged in parallel to the condenser lens array and comprising several projection lenses, wherein the projection lenses each comprise an aperture having a center, and an optical axis;

wherein exactly one of the projection lenses is assigned to each of the condenser lenses so that each of the condenser lenses and the respectively assigned projection lens form an optical channel of several optical channels and so that each of the several optical channels generates a partial light beam of the emerging light beam, said partial light beam emerging in an angle-of-emergence range with a partial intensity distribution that is homogenous with respect to an angle of emergence, from a partial light beam of the incident light beam, said partial light beam being incident within an admissible angle-of-incidence range of the respective optical channel, wherein the admissible angle-of-incidence ranges of the optical channels have the same size as to their magnitude in a plane extending in parallel to the optical axes of the condenser lenses; and wherein the angle-of-emergence ranges of at least two of the optical channels are different so that an intensity distribution with respect to the angle of emergence comprises in a far field of the emerging light beam several regions with a homogenous intensity.

In general, a lens array is characterized in that the optical axes of the individual lenses of the lens array extend in parallel and in that the individual lenses of the lens array are arranged along a plane extending perpendicularly to the optical axes. Two lens arrays are arranged in parallel to each other if the optical axes of the lenses of the one lens array extend in parallel to the optical axes of the lenses of the other lens array. The condenser lens array and the projection lens array may each be a micro-lens array.

In general, the aperture of a lens is understood to be the optically acting area of the lens in a plane perpendicular to its optical axis. The center of an aperture is understood to be a region around the center of gravity of the optically acting area of the respective lens.

The optical axis of the lens is an at least imaginary passage for light rays that does not refract the light rays. In two-dimensionally acting lenses, the optical axis comprises a point-shaped cross section so that the optical axis adopts the shape of a straight line. In one-dimensionally acting lenses, the optical axis comprises a straight line-shaped cross section so that the optical axis adopts the shape of a plane. The optical axis may be in the center of the aperture, at any location of the aperture or even outside the aperture.

The incident partial light beams are each a part of the incident light beam passing through a condenser lens of the condenser lens array. The emerging partial light beams are each a part of the emerging light beam emerging through a projection lens of the projection lens array.

The admissible angle-of-incidence range of an optical channel is the angular range in which light incident on the condenser lens of the optical channel is refracted such that the light hits the projection lens of the respective optical channel.

The main rays, also called center-of-gravity rays, of the angle-of-incidence ranges of different optical channels may be orientated in parallel to each other. This is of advantage if the partial light beams incident on the different optical channels are to be mostly parallel to each other. In particular, the main rays of the angle-of-incidence ranges may be orientated in parallel to the optical axes of the condenser lenses of the optical channels. This is of advantage if the partial light beams incident on the different optical channels are to mostly extend in parallel to the optical axes of the condenser lenses.

However, embodiments in which the main rays of the angle-of-incidence ranges of different optical channels extend at an angle to each other are also conceivable. This is of advantage if the partial light beams incident on the different optical channels are to comprise significantly different angles of incidence.

In general, an intensity distribution comprises several regions with a homogenous intensity if it includes several regions limited by slopes, said regions having a constant intensity different from zero. In this case, slopes are steep transitions to another intensity value.

The far field of the emerging light beam sets in a distance to the projection lens array measured along the optical axes of the projection lenses, said distance being large enough so that the distance of the projection lenses to the center of the array is neglectable. In other words, the far field is present where the optical beam former acts as an almost point-shaped light source.

The condenser lenses and the projection lenses may be one-dimensionally acting lenses or two-dimensionally acting lenses. For example, the one-dimensionally acting lenses may be cylinder lenses. In this case, the shape of the cylinder lenses may slightly deviate from an ideal cylinder shape in order to avoid aberrations. Without further measures, one-dimensional lenses only allow the generation of a one-dimensional intensity distribution.

For example, the two-dimensionally acting lenses may be spherical lenses. The lenses may also be configured as aspherical lenses whose surfaces deviate from an ideal spherical surface in order to avoid aberrations.

The condenser lenses and the projection lenses may comprise an individual curvature within the respective array in order to avoid aberrations.

In the inventive optical beam former, each of the optical channels generates an emerging partial light beam comprising a top-hat-shaped partial intensity distribution, i.e. an intensity distribution in which the intensity distribution within the angle-of-emergence range comprises a constant value, and wherein the partial intensity distribution outside of the angle-of-emergence range adopts the value of zero. The intensity distribution of the optical beam former results from the overlap of the partial intensity distributions of the individual optical channels.

In this case, the optical channels are configured such that at least two of the optical channels comprise different angle-of-emergence ranges, resulting in different partial intensity distributions. The intensity distribution of the optical beam former then results from the overlap of different partial intensity distributions. The intensity distribution of the beam former then comprises several regions with a respectively homogenous intensity in the far field of the emerging light beam. By accordingly configuring the optical channels, it is possible to generate almost any intensity distribution, in contrast to the classic honeycomb condenser of reference [2].

In the inventive optical beam former, since the admissible angle-of-incidence ranges of the optical channels have the same size as to their magnitude in a plane extending in parallel to the optical axes of the condenser lenses, the angular deviations of an actual incident light beam may be equally well compensated by all optical channels, in contrast to a theoretical light beam. This is a particular advantage with respect to the modified honeycomb condenser of reference [3], wherein the optical channels comprise different admissible angle-of-incidence ranges which each depend on the different numerical apertures of the projection lenses of the optical channels.

Since the inventive optical beam former does not require a diaphragm array in order to maintain the angle of acceptance of the classic honeycomb condenser, the optical beam former enables a transmission that is higher than that of the modified honeycomb condenser of reference [4].

The inventive optical beam former is also superior to diffusion disks since, on the one hand, it is étendue-maintaining, and on the other hand, it is more independent of the direction of incidence of the incident light beam.

The inventive optical beam former enables generating any symmetrical and asymmetrical far field distribution with a single element, keeping the advantages of the classic honeycomb condenser, i.e. the high transmission and the independence from the angle of irradiation, as long as the angle of acceptance corresponding to the numerical aperture of the projection lens array is not exceeded. In contrast to diffusers, the étendue is maintained with respect to the individual channel, enabling the realization of luminance-critical applications.

Advantageously, the inventive optical beam former may be used in étendue-critical and/or luminance-critical illumination systems with a non-homogenous luminous intensity distribution (intensity). For example, such beam formers are applied hi the general illumination for spotlights with a special angular distribution of the radiation or hi the field of vehicles, e.g. for headlights or backlights and flashing lights.

According to an advantageous further development of the invention, the apertures of the projection lenses are of the same type. Two lenses comprise an aperture of the same type if the apertures of the two lenses coincide with respect to their shape and area. If the apertures of the projections lenses of such an optical beam former are of the same type, there are no restrictions of the independence from the angle of incidence of the incident light beam, in contrast to the classic honeycomb condenser of reference [2]. In contrast to the modified honeycomb condenser of reference [3], the angle of acceptance of the optical beam former is larger since the angle of acceptance of the modified honeycomb condenser depends on the numerical aperture of the smallest projection lens.

According to an advantageous further development of the invention, main rays of the admissible angle-of-incidence ranges extend in parallel at least in some of the optical channels. These properties enable the use of the inventive optical beam former in cases in which at least some of the incident partial light beams of the incident light beam are incident essentially in parallel to each other.

According to an advantageous further development of the invention, main rays of the admissible angle-of-incidence ranges extend in parallel to the optical axes of the condenser lenses at least in some of the optical channels. These properties enable the use of the inventive optical beam former in cases in which at least some of the incident partial light beams of the incident light beam are incident essentially in parallel to the optical axes of the condenser lenses.

According to an advantageous further development of the invention, main rays of the admissible angle-of-incidence ranges extend obliquely with respect to each other at least in some of the optical channels. These properties enable the use of the inventive optical beam former in cases in which at least some of the incident partial light beams of the incident light beam are incident obliquely with respect to each other.

According to an advantageous further development of the invention, in each of the several optical channels, a focal point of the respective condenser lens in the direction of the optical axis of the respective condenser lens is located in a region of the projection lenses. In addition, in each of the several optical channels, a focal point of the respective projection lens in the direction of the optical axis of the respective projection lens is located in a region of the condenser lenses. This achieves that the partial intensity distributions of the emerging partial light beams are homogenous within the angle-of-emergence range and achieves that there are no undesired intensities outside of the angle-of-emergence range.

According to a functional further development of the invention, at least two of the different angle-of-emergence ranges overlap. In this way, a particularly high luminance may be achieved in the overlap regions.

According to an advantageous further development of the invention, in each of the optical channels, the optical axis of the respective condenser lens is equal to the optical axis of the respective projection lens. This simplifies the calculation of the condenser lenses and projection lenses needed for a certain intensity distribution. In addition, this results in simple and more easily manufactured geometrical shapes for the condenser lenses and the projection lenses.

According to a functional further development of the invention, the aperture of the condenser lens of one of the optical channels is larger than the apertures of the projection lenses, and wherein the aperture of the condenser lens of another one of the optical channels is smaller than the apertures of the projection lenses. Using differently sized condenser lenses makes it possible to easily generate different angle-of-emergence ranges. A regular arrangement of smaller condenser lenses and larger condenser lenses makes it possible to generate almost any symmetrical intensity distribution in the far field.

According to an advantageous further development of the invention, the condenser lenses of the condenser lens array include rectangular and square condenser lenses, whereas the projection lenses of the projection lens array include square or rectangular projection lenses. In this way, non-usable areas between the condenser lenses may be minimized even when using condenser lenses of different sizes.

According to a suitable further development of the invention, the condenser lenses with the smaller aperture comprises in the direction of its optical axis a smaller extension than the condenser lens with the larger aperture. When using condenser lenses of the same thickness, which would be desirable for optical reasons, high slopes in parallel to the respective optical axis are created in the smaller lenses along their edge. They can lead to the creation of stray light, which can decrease the achievable luminance on the one hand, and which can uncontrollably overlap the desired intensity distribution in the far field on the other hand. By using thinner small condenser lenses, such high slopes and their negative effects may be avoided.

According to an advantageous further development of the invention, the optical axis of the condenser lens of one of the optical channels comprises an offset with respect to a center of the aperture of the respective condenser lens. This offset is determined by its direction and by its magnitude. Through such offsets, it is also possible to generate asymmetrical intensity distributions in the far field. In order to avoid aberrations, astigmatic lenses may be used in this case.

According to a suitable further development of the invention, the optical axis of the condenser lenses of another one of the optical channels does not comprise an offset or comprises another offset with respect to the center of the aperture of the respective condenser lens. Such condenser lenses are also referred to as centered condenser lenses. Through the offset, it is possible to generate different angle-of-emergence ranges even if the apertures of the condenser lenses are of the same type. However, it is also possible to combine offsets in the condenser lenses with differently sized apertures in the condenser lenses.

According to an advantageous further development of the invention, the apertures of the condenser lenses of the condenser lens array are arranged in a regularly hexagonal manner and configured in the same way having a round or hexagonal shape, wherein the apertures of the projection lenses of the projection lens array are arranged in a regularly hexagonal manner and are configured having a round or hexagonal shape. In this way, non-usable intermediate areas between the lenses may be mostly avoided.

According to a functional further development of the invention, the optical axis of the projection lens of one of the optical channels comprises an offset with respect to the center of the aperture of the respective projection lens. Such projection lenses are also referred to as decentered projection lenses.

According to a functional further development of the invention, the optical axis of the projection lens of another one of the optical channels does not comprise an offset or comprises a different offset with respect to the center of the aperture of the respective projection lens. Projection lenses without an offset are also referred to as centered projection lenses. Combinations of optical channels with different offsets as well as combinations of non-offset channels with channels having offsets make it possible to generate different angle-of-emergence ranges even with condenser lenses of the same type, wherein symmetrical or asymmetrical intensity distributions are possible in the far field. Offsets in the projection lens arrays may be combined with offsets in the condenser lenses. Also, offsets in the projection lenses may be combined with different sizes of the apertures in the condenser lenses. Overall, this increases the degrees of freedom in the design of the optical beam former.

According to a functional further development of the invention, the condenser lens array is arranged at a first side of a substrate and the projection lens array is arranged at an opposite second side of the substrate. The substrate may be a transparent plate, wherein the condenser lens array and the projection lens array are each molded directly at the substrate and connected to the substrate in a molding tool by means of a non-heating and non-pressure casting method.

According to a functional further development of the invention, in each of the optical channels, the respective condenser lens focuses the respective incident partial light beam onto the center of the aperture of the respective projection lens if the respective incident partial light beam is incident in parallel to the optical axis of the respective condenser lens. Such an arrangement is of advantage if the incident light beam is incident essentially in parallel to the optical axes of the condenser lenses or the projection lenses. Here, when viewed in the direction of the optical axes, the condenser lens array and the projection lens array may be arranged congruently.

According to a further advantageous further development of the invention, in each of the optical channels, the respective condenser lens focuses the respective incident partial light beam onto the center of the aperture of the respective projection lens if the respective incident partial light beam is incident at an angle with respect to the optical axis of the respective condenser lens. Such an arrangement is of advantage if the incident light beam is incident at an angle with respect to the optical axes of the condenser lenses or the projection lenses. In this case, when viewed in the direction of the optical axes, the condenser lens array and the projection lens array may be arranged offset. In order to achieve the same admissible angle-of-incidence range with the incidence at different angles, the aperture of the assigned projection lens may be increased depending on the angle of incidence in order to consider projection effects.

In a further aspect, the invention concerns an optical beam former arrangement for generating an emerging light beam from an incident light beam, wherein the beam former arrangement comprises a first inventive optical beam former and a second inventive optical beam former, wherein the first optical beam former and the second optical beam former are arranged along a mutual plane, and wherein the intensity distribution of the first optical beam former and the intensity distribution of the second optical beam former are different.

If the first optical beam former and the second optical beam former are arranged along a mutual plane, this means that the optical axes of the condenser lenses of the first optical beam former and the optical axes of the condenser lenses of the second optical beam former are in parallel to each other, which at the same time signifies that the optical axes of the projection lenses of the first optical beam former and the optical axes of the projection lenses of the second optical beam former are in parallel to each other, wherein the first optical beam former and the second optical beam former do not comprise an offset in the direction of the optical axes. In addition, the plane extends perpendicularly to the optical axes of the first beam former and perpendicularly to the optical axes of the second beam former.

The use of several optical beam formers arranged side-by-side may comprise advantages as to manufacturing in contrast to the use of a single beam former having the same optical characteristics.

In a further aspect, the invention concerns an optical beam former arrangement for generating an emerging light beam from an incident light beam, wherein the beam former arrangement comprises a first inventive optical beam former and a second inventive beam former, wherein the first optical beam former and the second optical beam former are arranged such that at least a part of the emerging light beam of the first optical beam former is provided to the second optical beam former as its incident light beam.

In such a beam former arrangement, the optical axes of the condenser lenses of the first optical beam former and the optical axes of the condenser lenses of the second optical beam former may be in parallel to each other so that the optical axes of the projection lenses of the first optical beam former and the optical axes of the projections lenses of the second optical beam former are also in parallel to each other. However, it is also possible that there is an angle provided between the optical axes of the first optical beam former and the optical axes of the second optical beam former, however, said angle should be smaller than the angle of acceptance of the second optical beam former. In this case, the first optical beam former and the second optical beam former comprise an offset in the direction of the optical axes.

For example, the first optical beam former and the second optical beam former may be configured to generate a one-dimensional intensity distribution. To this end, the first optical beam former may comprise a condenser lens array and a projection lens array having one-dimensionally acting lenses that are aligned in parallel to each other. The second optical beam former may also comprise a condenser lens array and a projection lens array having one-dimensionally acting lenses that are aligned in parallel to each other but perpendicularly to the one-dimensionally acting lenses of the first optical beam former. The sequential arrangement of the first optical beam former and the second optical beam former results in a two-dimensional intensity distribution. The one-dimensionally acting lenses may be cylinder lenses, for example. In this case, the shape of the cylinder lenses may slightly deviate from an ideal cylinder shape in order to avoid aberrations. The advantage of the arrangement is that one-dimensional lenses are easier to manufacture than two-dimensionally acting lenses but that a two-dimensional intensity distribution may still be generated.

The use of several sequentially arranged optical beam formers may have advantages with respect to manufacturing in contrast to the use of a single beam former having the same optical characteristics.

In a further aspect, the invention concerns an optical system for generating an emerging light beam from an incident light beam, wherein the optical system comprises an inventive optical beam former and a collecting optic for focusing the emerging light beam of the optical beam former onto a plane. In this way, a luminance corresponding to the intensity distribution in the far field of the emerging light beam of the beam former may be achieved on the plane.

In a further aspect, the invention concerns an optical system for generating a focused emerging light beam from an incidence light beam, wherein the optical system comprises an inventive optical beam former and a diverging optic in order to increase a divergence of the emerging light beam of the optical beam former.

In a further aspect, the invention concerns an optical system for generating an emerging light beam from an incident light beam, wherein the optical system comprises an inventive optical beam former arrangement and a collecting optic for focusing the emerging light beam of the optical beam former arrangement onto a plane. In this way, a luminance corresponding to the intensity distribution in the far field of the emerging light beam of the beam former arrangement may be achieved on the plane.

In a further aspect, the invention concerns an optical system for generating an emerging light beam from an incident light beam, wherein the optical system comprises an inventive optical beam former arrangement and a diverging optic for increasing a divergence of the emerging light beam of the optical beam former arrangement.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
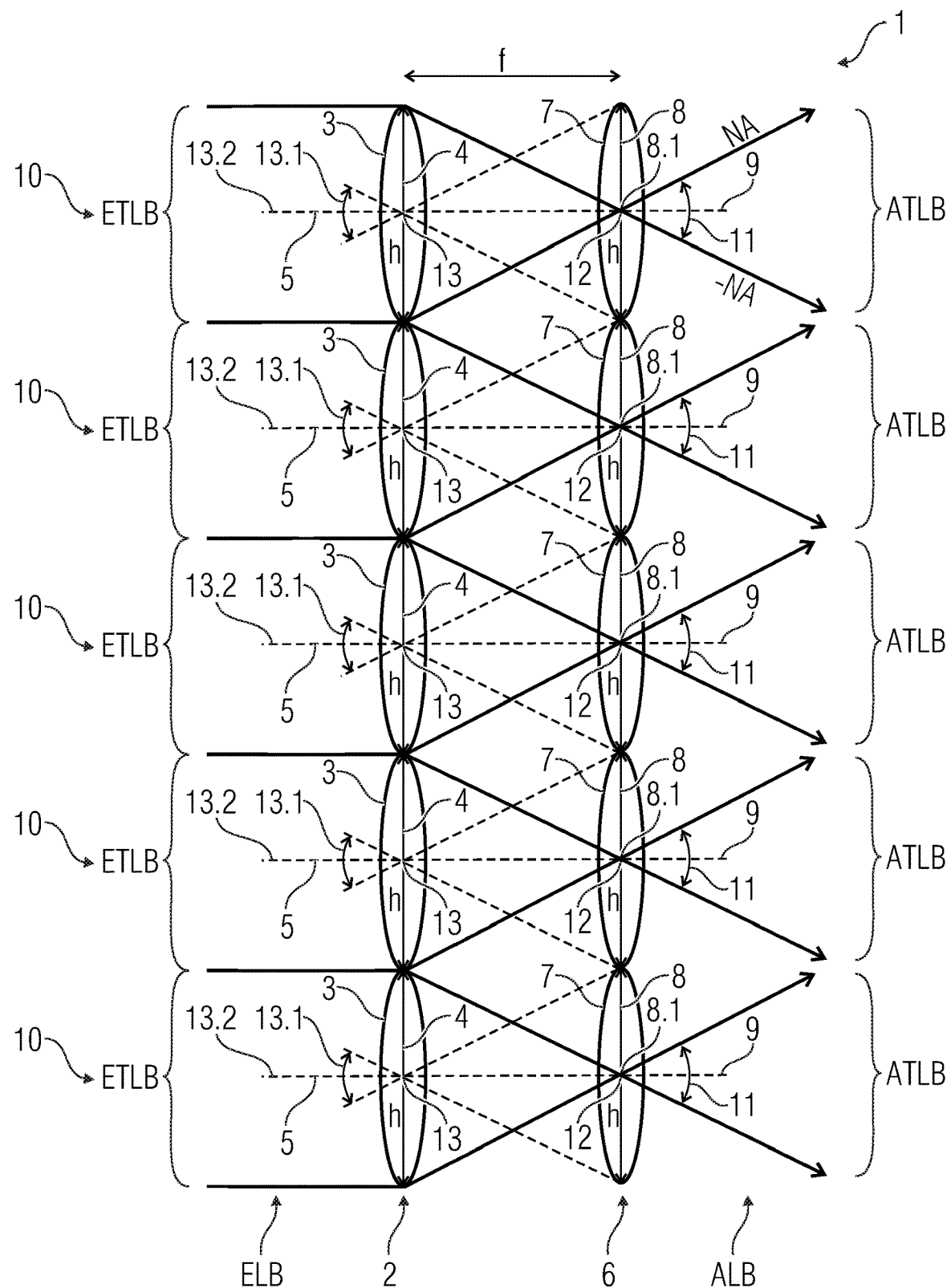
FIG. 1 shows an optical beam former having several optical channels, known from the conventional technology.

The same elements or elements of the same type or elements having the same or equivalent functions are in the following provided with the same reference numerals or reference numerals of the same type.

In the following description, embodiments having a plurality of features of the present invention are described in more detail in order to convey a better understanding of the invention. However, it is to be noted that the present invention may also be implemented omitting individual ones of the described features. It is further to be noted that the features shown in the different embodiments may also be combined differently if this is not explicitly excluded or would lead to contradictions.

FIG. 1 shows an optical beam former 1 known from the conventional technology. The optical beam former 1 for generating an emerging light beam ALB from an incident light beam ELB includes a condenser lens array 2 for receiving the incident light beam ELB, comprising several condenser lenses 3, wherein the condenser lenses 3 each comprise an aperture 4 and an optical axis 5. In addition, the optical beam former 1 includes a projection lens array 6 for radiating the emerging light beam ALB, arranged in parallel to the condenser lens array 2 and comprising several projection lenses 7 each comprising an aperture 8 having a center 8.1, and an optical axis 9. In this case, exactly one of the projection lenses 7 is assigned to each of the condenser lenses 3 so that each of the condenser lenses 3 and the respectively assigned projection lens 7 form an optical channel 10 of several optical channels 10 and so that each of the several optical channels 10 generates a partial light beam ATLB of the emerging light beam ALB, said partial light beam emerging in an angle-of-emergence range 11 with a homogenous partial intensity distribution TIV, from an incident partial light beam ETLB of the incident light beam ELB.

All of the condenser lenses 3 are configured in the same way. Also, all of the projection lenses 7 are configured in the same way. In addition, the condenser lenses 3 and the projection lenses 7 are structured in the same way. In particular, the condenser lenses 3 and the projection lenses 7 correspond to each other as to their aperture 8 and their focal length. All of the condenser lenses 3 and the projection lenses 7 are arranged such that their respective optical axis 5 and 9, respectively, extends through the center of the respective aperture 4 and 8, respectively. Furthermore, the focal point of each condenser lens 3 is located in the center 8.1 of the assigned projection lens 7. Also, the focal point 13 of each projection lens 7 is located in the center of the assigned condenser lenses 3.

In classic honeycomb condenser, the admissible angle-of-incidence ranges 13.1 have the same size as to their magnitude in all optical channels 10. The main rays 13.2 of the angle-of-incidence ranges 13.1 correspond to the optical axes 5 of the condenser lenses 3.

Figure 2:
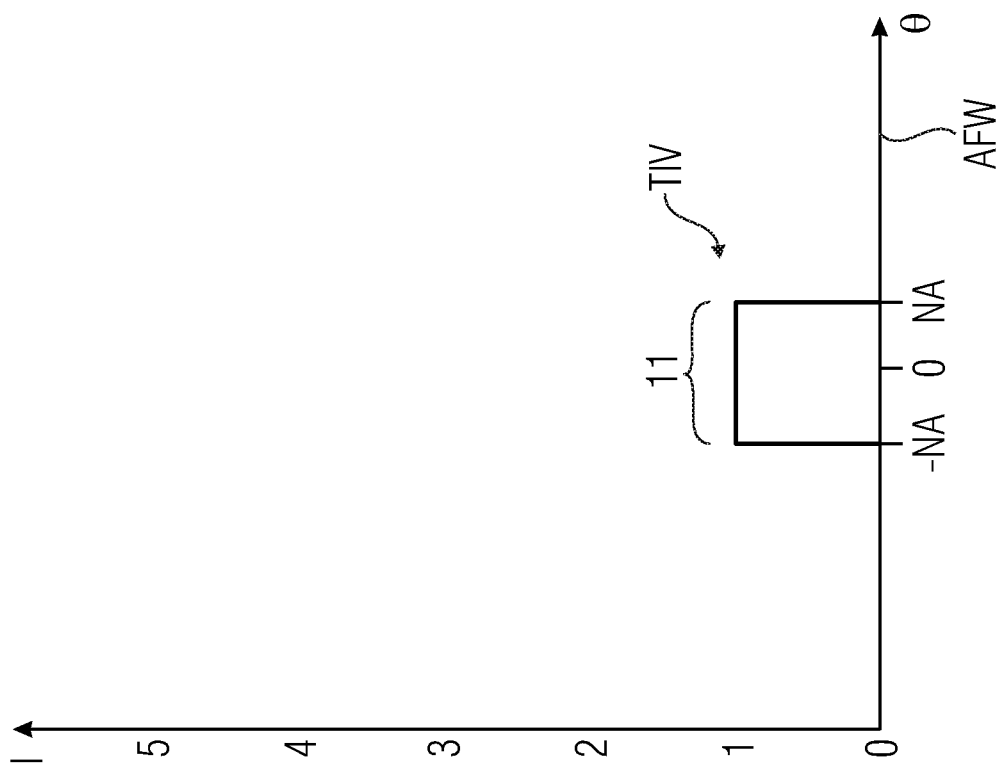
FIG. 2 shows the angle-of-emergence ranges and the partial intensity distributions of the emerging partial light beams of the optical channels of the optical beam former of FIG. 1.

FIG. 2 shows the angle-of-emergence ranges 11 and the partial intensity distributions TIV of the emerging partial light beams ATLB of the optical channels 10 of the optical beam former 1 of FIG. 1. In this case, each of the optical channels 10 has the same angle-of-emergence range 11 in which the respective emerging partial light beam ATLB comprises a homogenous intensity distribution. In this case, the partial intensity distributions TIV are normalized to the intensity of one of the optical channels 10.

Figure 3:
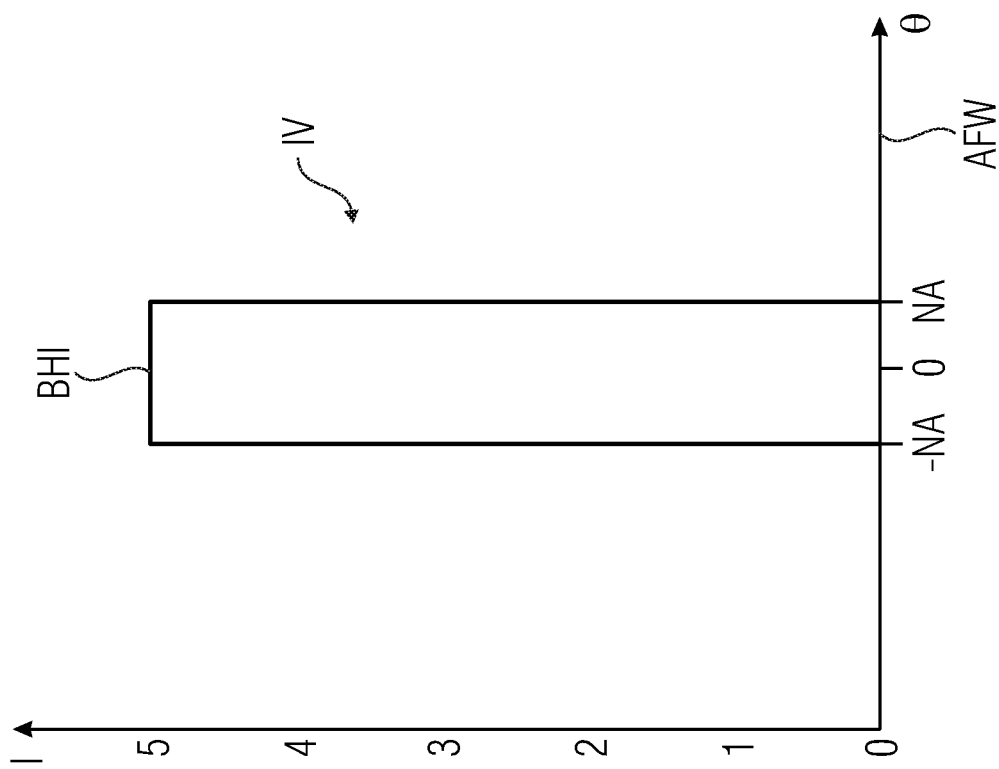
FIG. 3 shows the resulting intensity distribution of the emerging light beam of the optical beam former of FIG. 1.

FIG. 3 shows the resulting intensity distribution IV of the far field of the emerging light beam ALB of the optical beam former of FIG. 1. The intensity distribution IV results from the overlap of the partial intensity distribution TIV. The intensity distribution IV comprises only one region BHI having a homogenous intensity.

Figure 4:
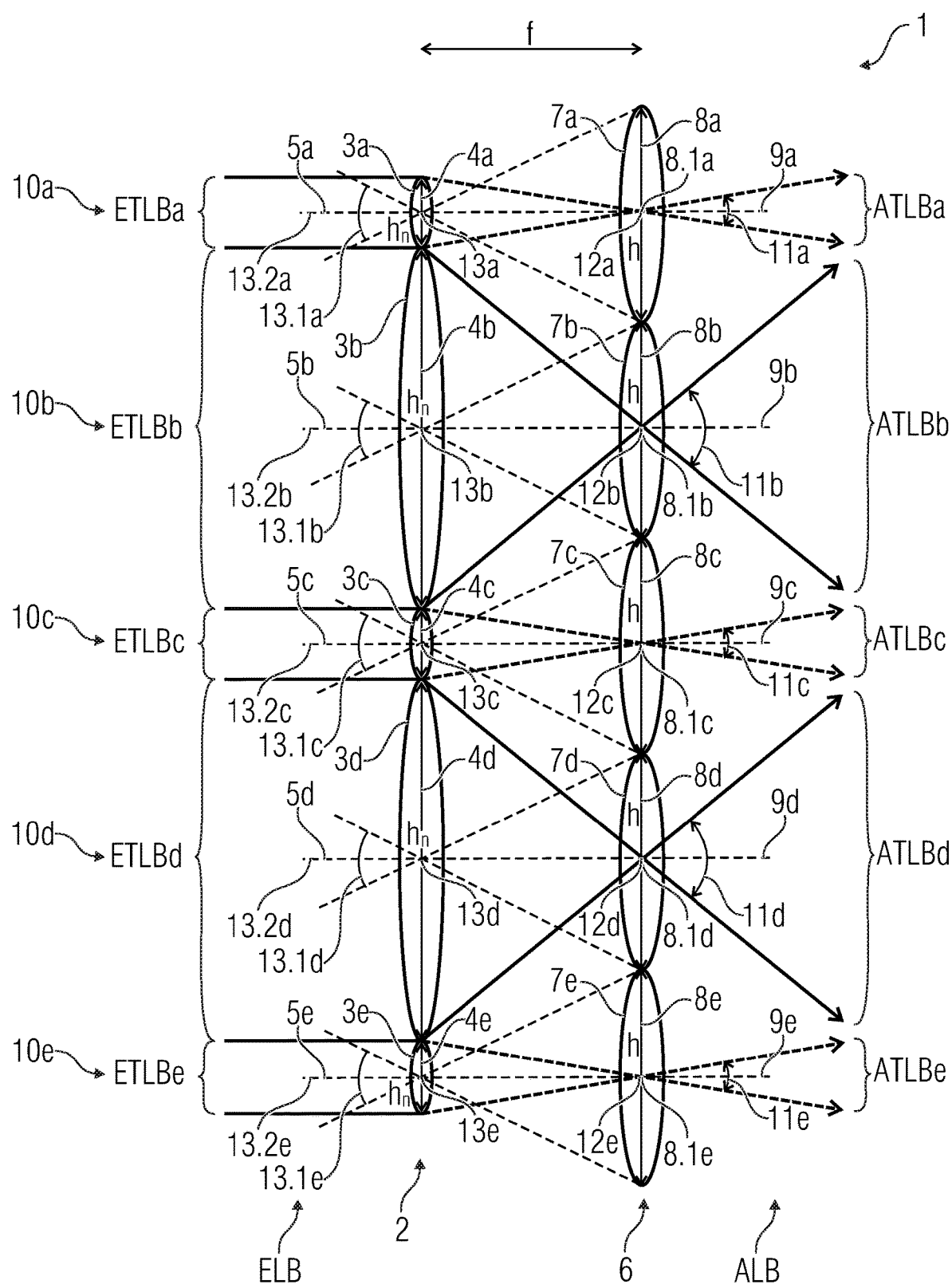
FIG. 4 shows a first embodiment of an inventive optical beam former in a schematic sectional side view.

FIG. 4 shows a first embodiment of an inventive optical beam former in a schematic sectional side view. An optical beam former for generating an emerging light beam ALB from an incident light beam ELB, the optical beam former 1 including:

a condenser lens array 2 for receiving the incident light beam ELB, comprising several condenser lenses 3, wherein the condenser lenses 3 each comprise an aperture 4 and an optical axis 5, wherein the optical axes 5 of the condenser lenses 3 extend in parallel to each other; and a projection lens array 6 for radiating the emerging light beam ALB, arranged in parallel to the condenser lens array 2 and comprising several projection lenses 7, wherein the projection lenses 7 each comprise an aperture 8 having a center 8.1, and an optical axis 9;

wherein exactly one of the projection lenses 7 is assigned to each of the condenser lenses 3 so that each of the condenser lenses 3 and the respectively assigned projection lens 7 form an optical channel 10 of several optical channels 10 and so that each of the several optical channels 10 generates a partial light beam ATLB of the emerging light beam ALB, said partial light beam emerging in an angle-of-emergence range 11 with a partial intensity distribution TIV that is homogenous with respect to an angle of emergence AFW, from a partial light beam ETLB of the incident light beam ELB, said partial light beam being incident within an admissible angle-of-incidence range 13.1 of the respective optical channel 10, wherein the admissible angle-of-incidence ranges 13.1 of the optical channels 10 have the same size as to their magnitude in a plane extending in parallel to the optical axes 5 of the condenser lenses 3; and wherein the angle-of-emergence ranges 11 of at least two of the optical channels 10 are different so that an intensity distribution IV with respect to the angle of emergence AFW comprises in a far field of the emerging light beam ALB several regions BHI having a homogenous intensity.

According to an advantageous further development of the invention, the apertures of the projection lenses 7 are of a similar type.

According to an advantageous further development of the invention, in each of the several optical channels 10, the focal point 12 of the respective condenser lens 3 in the direction of the optical axis 5 of the respective condenser lens 3 is located in a region of the projection lenses 7, and a focal point 13 of the respective projection lens 7 in the direction of the optical axis 9 of the respective projection lens 7 is located in a region of the condenser lenses 3.

According to a functional further development of the invention, at least two of the different angle-of-emergence ranges 11 overlap.

According to an advantageous further development of the invention, in each of the optical channels 10, the optical axis 5 of the respective condenser lens 3 is equal to the optical axis 9 of the respective projection lens 7.

According to a functional further development of the invention, the aperture 4 of the condenser lens 3 of one of the optical channels 10 is larger than the apertures 8 of the projection lenses 7, wherein the aperture 4 of the condenser lens 3 of another one of the optical channels 10 is smaller than the apertures 8 of the projection lenses.

According to an advantageous further development of the invention, in each of the optical channels 10, the respective condenser lens 3 focuses the respective incident partial light beam ETLB onto the center 8.1 of the aperture 8 of the respective projection lens 7 if the respective incident partial light beam ETLB is incident in parallel to the optical axis 5 of the respective condenser lens 3.

According to a functional further development of the invention, in each of the optical channels 10, the respective condenser lens 3 focuses the respective incident partial light beam ETLB onto the center 8.1 of the aperture 8 of the respective projection lens 7 if the respective incident partial light beam ETLB is incident at an angle with respect to the optical axis 5 of the respective condenser lens 3.

According to a functional further development of the invention, main rays 13.1 of the admissible angle-of-incidence ranges 13.1 extend in parallel at least in some of the optical channels 10.

According to a functional further development of the invention, main rays 13.2 of the admissible angle-of-incidence ranges 13.1 extend in parallel to the optical axis 5 of the condenser lenses 3 at least in some of the optical channels 10.

In FIG. 4, the incident light beam ELB is incident in parallel to the optical axes 5 and 9 so that the incident partial light beams ETLB are focused onto the centers 8.1 of the apertures 8 of the respective projection lenses 7. However, if the incident light beam ELB were to be incident slightly obliquely from above, the incident partial light beams ETLB would be focused slightly lower onto the apertures 8 of the respective projection lenses 7. On the other hand, if the incident light beam ELB were to be incident slightly obliquely from below, the incident partial light beams ETLB would be focused slightly higher onto the apertures 8. However, this would have no consequences for the angle-of-emergence ranges 11 of the emerging partial light beams ATLB and the partial intensity distributions TIV resulting therefrom, since this would only signify a lateral displacement of the enlarging light beam ALB that is neglectable in the far field. Thus, the intensity distribution IV is independent of an angle of incidence of the incident light beam ELB measured with respect the optical axes 5 and 9 if the incident partial light beams ETLB are still focused onto the projection lens 7 of the respective channel. The angle of incidence in which this condition is still fulfilled is also referred to as angle of acceptance. In this case, the angle of acceptance is equal to the numerical aperture NA of the projection lenses 7. The numerical aperture NA is calculated in the paraxial approximation according to NA=h/2f from the focal length f and the height h of the projection lenses 7. This corresponds to the angle of acceptance of the classic honeycomb condenser of FIG. 1 so that, in contrast to the classic honeycomb condenser, the independence of the optical beam former with respect to the angle of irradiation is not limited.

In FIG. 4, the main rays 13.2a-e of the angle-of-incidence ranges 13.1a-e of the optical channels 10a-e are orientated in parallel to each other. In addition, the main rays 13.2a-e of the angle-of-incidence ranges 13.1a-e are orientated in parallel to the optical axes 5a-e of the condenser lenses 3a-e of the optical channels 10a-e.

In the embodiment of FIG. 4, the condenser lens array 2 comprises condenser lenses 3a-e having different apertures 4a-e, respectively. Thus, the condenser lenses 3b and 3d have an aperture 4b and 4d, respectively, which are significantly larger than the apertures 4a, 4c and 4e of the condenser lenses 3a, 3c and 3e, respectively. In contrast, the projection lens array 6 comprises projection lenses 7a-e having the same apertures 8a-e, respectively. The optical axes 5a-e of the condenser lenses 3a-e correspond to the optical axes 9a-e of the projection lenses 7a-e, respectively. The optical axes 5a-e of the condenser lenses 3a-e extend in the center of gravity of the apertures 4a-e of the condenser lenses 3a-e, respectively. The optical axes 9a-e of the projection lenses 7a-e extends in the center of gravity of the apertures 8a-e of the projections lenses 7a-e, respectively.

If $h_n$ is the height of the condenser lens 3a-e of one of the optical channels 10a-e and NA, is the half angle-of-emergence range 11a-e of the respective optical channel 10a-e, the half angle-of-emergence range 11a-e of the respective optical channel 10a-e is calculated according to:

$$NA_n = NA \frac{h_n}{h}. \tag{2}$$

The resulting luminosity distribution IV of an optical beam former 1 having N condenser lenses in the far field results from the summation of the irradiation of its optical channels 10. Assuming a homogenous illumination intensity (luminance) E on the condenser lens array 2, the resulting luminosity IV results in the far field for a condenser lens array 2 having rectangular tightly packed condenser lenses 3 having a width and height $w_n$ and $h_n$ in the paraxial approximation as:

$$I(\theta_{x,y}) = E \sum_{n=1}^{N} \frac{A_n}{\Omega_n} \prod \frac{\theta_x f + \Delta_{x_n} - \delta_{x_n}}{2fNA_{x_n}} \prod \frac{\theta_y f + \Delta_{y_n} - \delta_{y_n}}{2fNA_{y_n}} \tag{3}$$

$$\text{with } \prod(x) = \begin{cases} 0 \text{ for } |x| > 1/2 \\ 1 \text{ for } |x| \le 1/2 \end{cases}$$

Here, $A_n$ is the area of the n-th condenser lenses 3 and $\Omega_n$ is the spatial angle of the irradiation of the n-th optical channel 10. Inserting $A_n$ and the paraxially approximated spatial angle $\Omega_n$.

$$A_n = w_n h_n \text{ and } \Omega_n = \frac{w_n h_n}{f^2}$$

simplifies the equation to:

$$I(\theta_{x,y}) = Ef^2 \sum_{n=1}^{N} \prod \frac{\theta_x f + \Delta_{x_n} - \delta_{x_n}}{2fNA_{x_n}} \prod \frac{\theta_y f + \Delta_{y_n} - \delta_{y_n}}{2fNA_{y_n}}. \tag{4}$$

The design of a beam former 1 for generating any light distribution I(θ) needs the solution of the equation (4) using the following side conditions:

(i) In order to achieve a high system transmission, the filling coefficient of the condenser lens array 2 should ideally be 1, but at least as large as possible. For the case of rectangular condenser lenses 3, this correspond to the request:

$$\Sigma w_n = W \text{ and } \Sigma h_n = H \tag{5}$$

wherein W and H describe the total expansion of the condenser lens array 2, (ii) Groups of neighboring optical channels 10 that are configured in the same way and that can generate the requested output luminosity distribution without the use of further channels 10 are referred to as clusters. The larger the number of clusters of a beam former, the larger a homogenization effect compensating local deviations of the illumination intensity E of the incident light beam. Advantageously, more than 10 are provided.

(iii) Implementing the condenser lens array 2 with the smallest possible apertures 4 also serves this goal. If apertures 4, focal lengths, decentrations and therefore also the distance of the condenser array and the projection array are linearly scaled in a mutual manner, the resulting intensity distribution IV remains constant in the far field of the optical beam former 1. This therefore also applies to the area expansion of a cluster, which should be as small as possible. In order to achieve the étendue of the optical beam former 1 that is requested by the specific application, the resulting clusters are replicated as arrays until the requested element area and therefore the requested element étendue is achieved.

(iv) In polychromatic systems, i.e. multi-color systems, embodiments having condenser lenses of different sizes and/or comprising an offset are advantageous to embodiments having deflecting projection lenses in order to achieve the desired intensity distribution.

Regular projection lens arrays 6 are more cost effective, may be manufactured in a better quality and cause less chromatic aberrations that manifest as a color fringe in the white-light illumination in the far field. The herein-described mathematical model $I(\theta_{x,y})$ for a separable intensity distribution IV in the far field of an optical beam former 1 may also be used for optical beam former arrangements with several beam formers 1. Fundamentally, it may also be applied to non-separable distributions.

Figure 5:
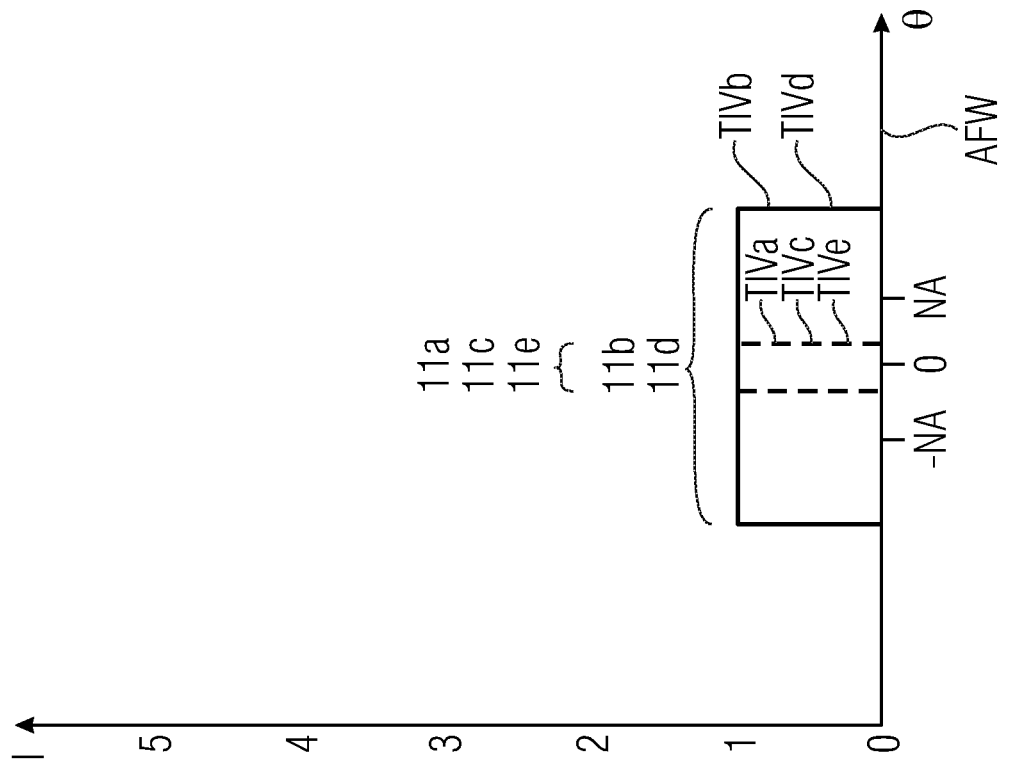
FIG. 5 shows the angle-of-emergence ranges and the partial intensity distributions of the emerging partial light beams of the optical channels of the optical beam former of FIG. 4.

FIG. 5 shows the angle-of-emergence ranges 11a-e and the partial intensity distributions TIVBa-e of the emerging partial ATLBa-e of the optical channels 10a-e of the optical beam former 1 of FIG. 4. In this case, the partial intensity distributions TIVBa-e are normalized to an intensity of 1. It is to be noted that the intensity in each of the angle-of-emergence ranges 11 a-e has the same size since smaller lenses 3a, 3c and 3e receive less light but output it across a smaller angle-of-emergence range 11a, 11c and lie than is the case in the larger lenses 3b and 3d with the angle-of-emergence ranges 11b and 11d.

Figure 6:
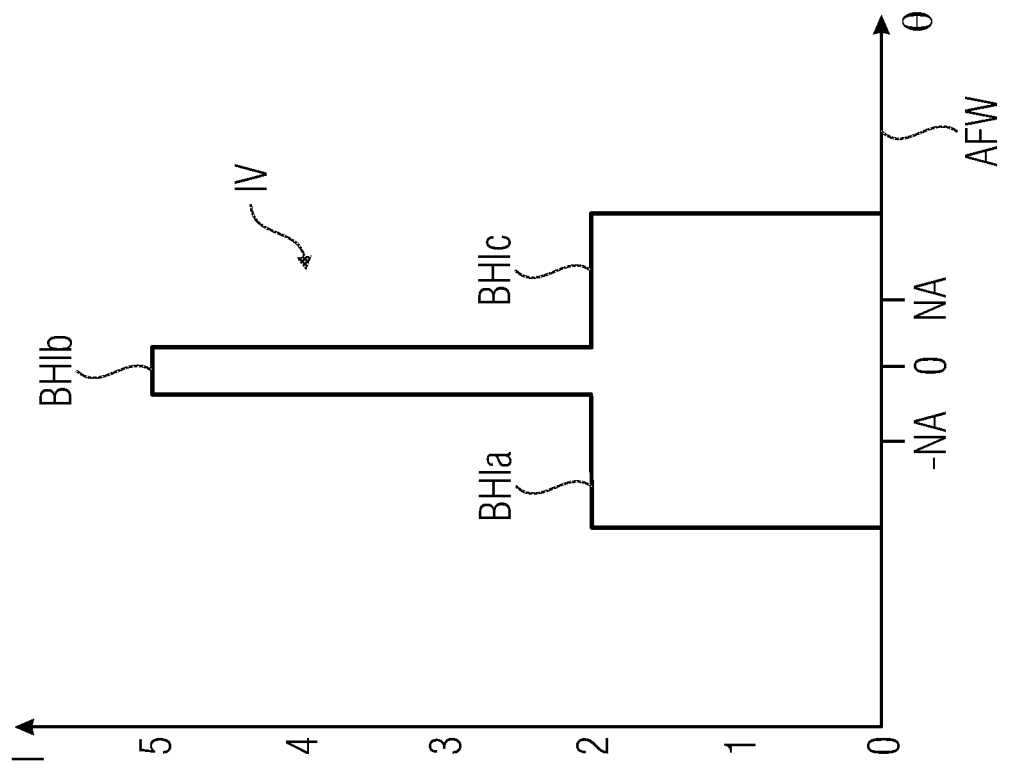
FIG. 6 shows the resulting intensity distribution of the emerging light beam of the optical beam former of FIG. 4.

FIG. 6 shows the resulting intensity distribution IV of the emerging light beam ALB of the optical beam former 1 of FIG. 4, resulting from the overlap of the emerging partial light beams ATLBa-e of the optical channels 10a-e of the optical beam former 1.

The angle-of-emergence ranges 11b and 11d overlap in the region BHIa so that a normalized intensity of 2 results. On the other hand, the angle-of-emergence ranges 11a-b overlap in the region BHIb so that a normalized intensity of 5 results. Finally, the angle-of-emergence ranges 11b and 11d overlap in the region BHIc so that a normalized intensity of 2 results again.

With the beam former 1 of FIG. 4, any symmetrical intensity distributions IV are possible.

Figure 7:
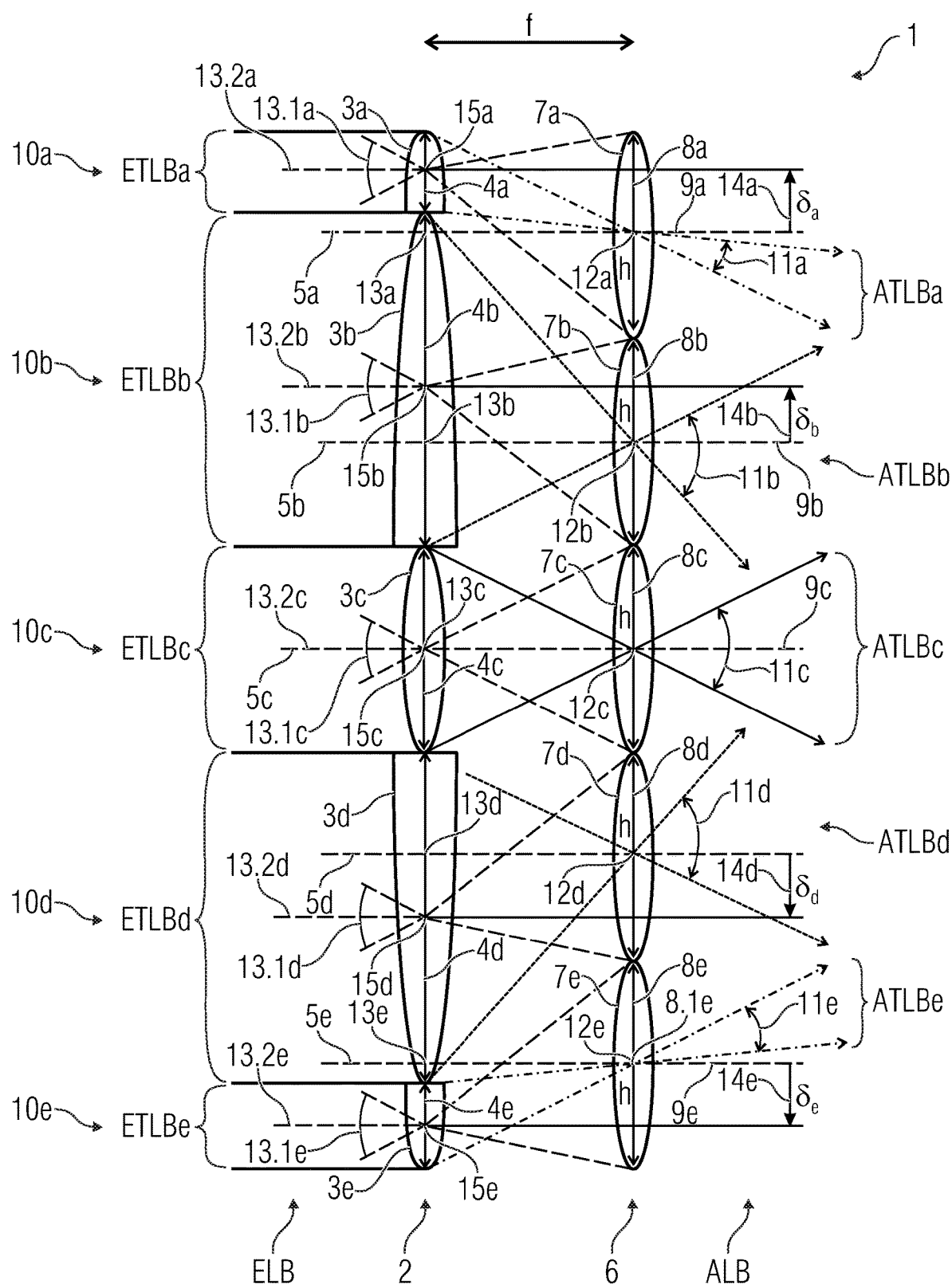
FIG. 7 shows a second embodiment of an inventive optical beam former in a schematic sectional side view.

FIG. 7 shows a second embodiment of an inventive optical beam former 1 in a schematic sectional side view.

According to a functional further development of the invention, the optical axis 5 of the condenser lens 3 of one of the optical channels 10 comprises an offset 14 with respect to a center 15 of the aperture 4 of the respective condenser lens 3.

According to a further development of the invention, the optical axis 5 of the condenser lens 3 of another one of the optical channels 10 does not comprise an offset 14 or comprises a different offset 14 with respect to the center 15 of the aperture 4 of the respective condenser lens 3.

According to a further development of the invention, the apertures 4 of the condenser lenses 3 of the condenser lens array 2 are arranged in a regularly hexagonal manner and are configured in the same way having a round or hexagonal shape, whereas the apertures 8 of the projection lenses 7 of the projection lens arrays 6 are arranged in a regularly hexagonal manner and are configured having a round or hexagonal shape.

The main rays 13.2a-e of the angle-of-incidence ranges 13.1a-e of the optical channels 10a-e are also orientated in parallel in FIG. 7. In addition, the main rays 13.2a-e of the angle-of-incidence ranges 13.1a-e are orientated in parallel to the optical axes 5a-e of the condenser lenses 3a-e of the optical channels 10a-e.

If δ indicates the offset 14 of a condenser lens 3 of one of the optical channels 10, the respective emerging partial light beam ATLB is inclined with respect to the optical axis 9 of the assigned projection lens 7 in a paraxial approximation about an angle $\delta_n/f$ so that a deflection of the respective emerging partial light beam ATLB results through the offset 14.

In the embodiment of FIG. 7, the condenser lens array 2 comprises condenser lenses 3a, 3b, 3d and 3e, comprising an offset 14a, 14b, 14d and 14e, respectively. The optical axes 5a, 5b, 5d and 5e of the condenser lenses 3a, 3b, 3d and 3e therefore do not extend in the center of gravity 15a, 15b, 15d and 15e of the apertures 4a, 4b, 4d and 4e of the condenser lenses 3a, 3b, 3d and 3e. Only the optical axis 5c of the non-offset condenser lens 3c extends through the center of gravity 15c of its aperture 4c. In contrast, the projection lens array 6 solely comprises projection lenses 7a-e not having an offset. Therefore, all optical axes 9a-e of the projection lenses 7a-e extend in the center of gravity 8.1a-e of the apertures 8a-e of the projection lenses 7a-e.

The condenser lens array 2 comprises condenser lenses 3a-e having significantly different apertures 4a-e. In contrast, the projection and lens array 6 comprises projection lenses 7a-e having almost the same aperture 8a-e.

Due to the offset 14, the distance of the center of the projection lens 7a to the center 15a of the condenser lens 3a in the optical channel 10a is larger than the distance of the center of the projection lens 7c to the center 15c of the condenser lens 3c in the optical channel 10c. For the angle of acceptance in the region 13.1a to be equal to the angle of acceptance in the region 13.1b, the aperture 8a of the condenser lens 7a is slightly larger than the aperture 8c of the condenser lens 7c. This similarly also applies to the other optical channels 10b, 10d and 10e having offsets 14b, 14d and 14e.

The numerical aperture NA is here calculated in a paraxial approximation according to NA=h/2f from the focal length f and the height h of the projection length 7c having the smallest aperture 8c. This corresponds approximately to the angle of acceptance of the classic honeycomb condenser of FIG. 1 so that, in contrast to the classic honeycomb condenser, the independence of the inventive optical beam former with respect to the irradiation direction is almost not limited.

Figure 8:
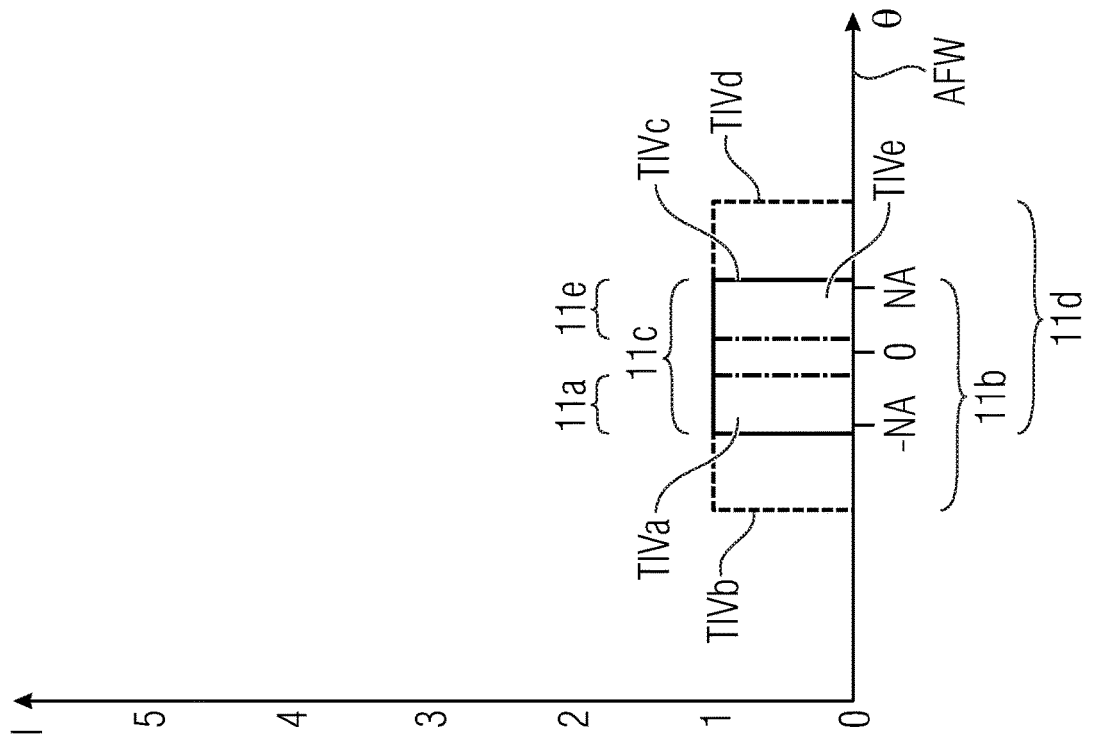
FIG. 8 shows the angle-of-emergence ranges and the partial intensity distributions of the emerging partial light beams of the optical channels of the optical beam former of FIG. 7.

FIG. 8 shows the angle-of-emergence ranges 11 *a-e* and the partial intensity distributions TIVa-e of the emerging partial light beams ATLBa-e of the optical channels 10*a-e* of the optical beam former 1 of FIG. 7.

Figure 9:
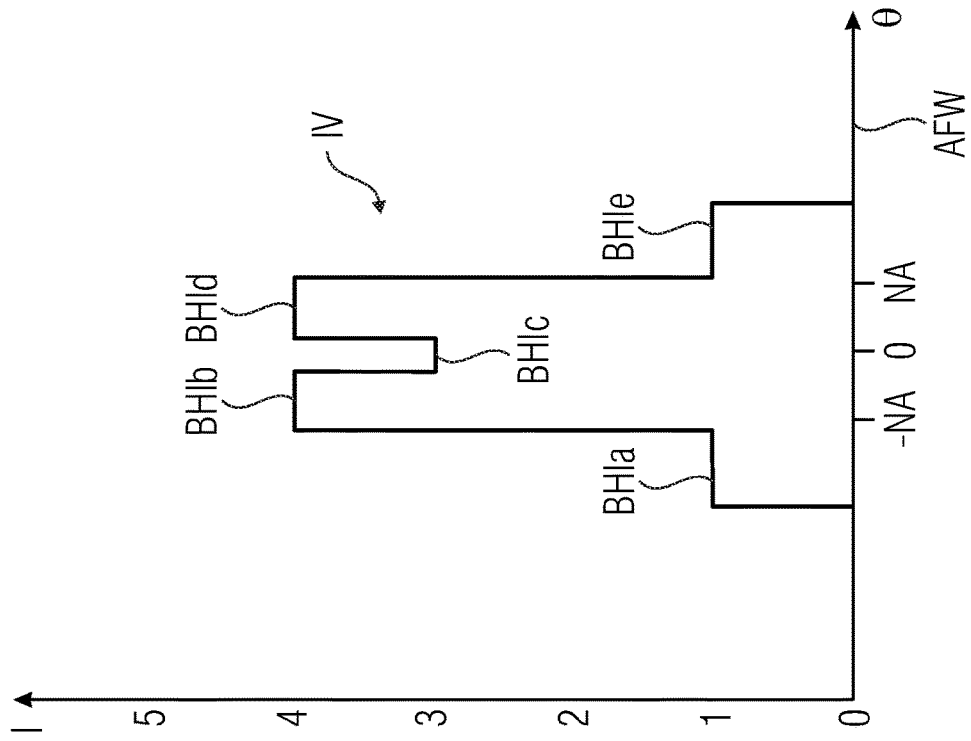
FIG. 9 shows the resulting intensity distribution of the emerging light beam of the optical beam former of FIG. 7.

FIG. 9 shows the resulting intensity distribution of the emerging light beam of the optical beam former of FIG. 7.

Any asymmetrical or symmetrical intensity distributions IV are possible with the beam former 1 of FIG. 7.

Figure 10:
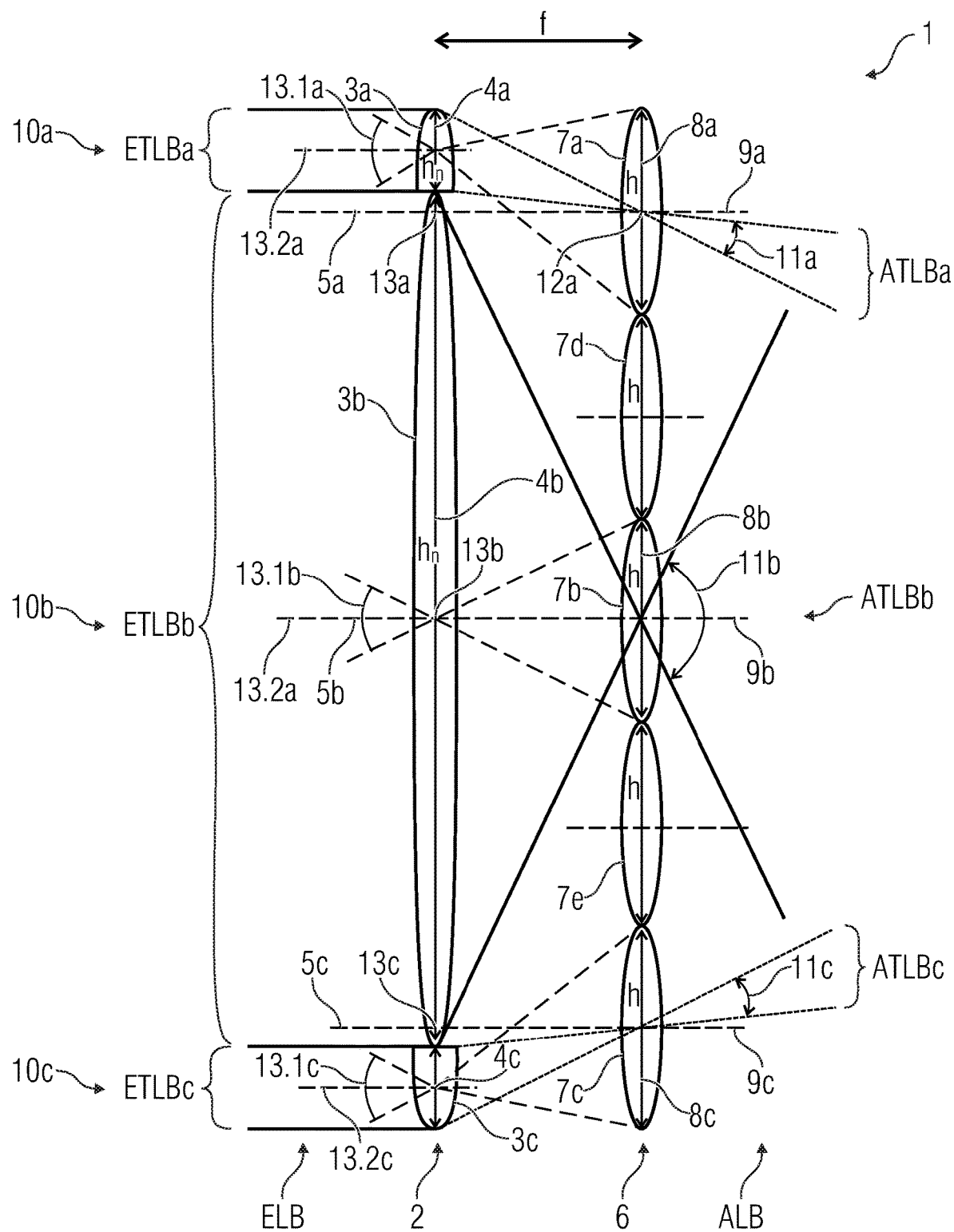
FIG. 10 shows a third embodiment of an inventive optical beam former in a schematic sectional side view.

FIG. 10 shows a third embodiment of an inventive optical beam former 1 in a schematic sectional side view. The third embodiment is based on the second embodiment. However, it comprises the following particularity: As before, the projection lens array 6 comprises five projection lenses 7*a-e*, on the other hand, the condenser lens array 2 only comprises three condenser lenses 3*a-c*. In the example of FIG. 10, this makes it possible to provide a particularly large aperture 4*b* for the condenser lenses 3*b*, which enables a particularly large angle-of-emergence range 11*b*.

In this case, the condenser lens 3*a* and the projection lens 7*a* form a first optical channel 10*a*, the condenser lens 3*b* and the projection lens 7*b* form a second optical channel 10*b* and the condenser lens 3*c* and the projection lens 7*c* form a third optical channel 10*c*. The projection lenses 7*d* and 7*e* do not comprise any optical function. Thus, they could also be omitted. However, it may still make sense to provide the projection lenses 7*d* and 7*e* since the projection lens array 6 may be manufactured with the same molding tool with which the projection lens array 6 of the second embodiment may be manufactured.

In a non-depicted embodiment, the condenser lens array 2 comprises more condenser lenses 3 than the projection lens array 6 comprises projection lenses 7. In this case, one of the projection lenses 7 may be assigned to several of the condenser lenses 3 so that these projection lenses 7 form part of several of the optical channels 10.

In the embodiment of FIG. 10, the optical channels 10*a* and 10*c* comprise an offset, which is not drawn for the sake of clarity. Thus, the apertures 8*a* and 8*c* of the projection lenses 7*a* and 7*c* are slightly larger than the aperture 8*b* of the projection lens 7*b* in order to ensure that the admissible angle-of-incidence ranges 13.1*a* and 13.1*c* are as large as the admissible angle-of-incidence range 13.1*b*.

Figure 11:
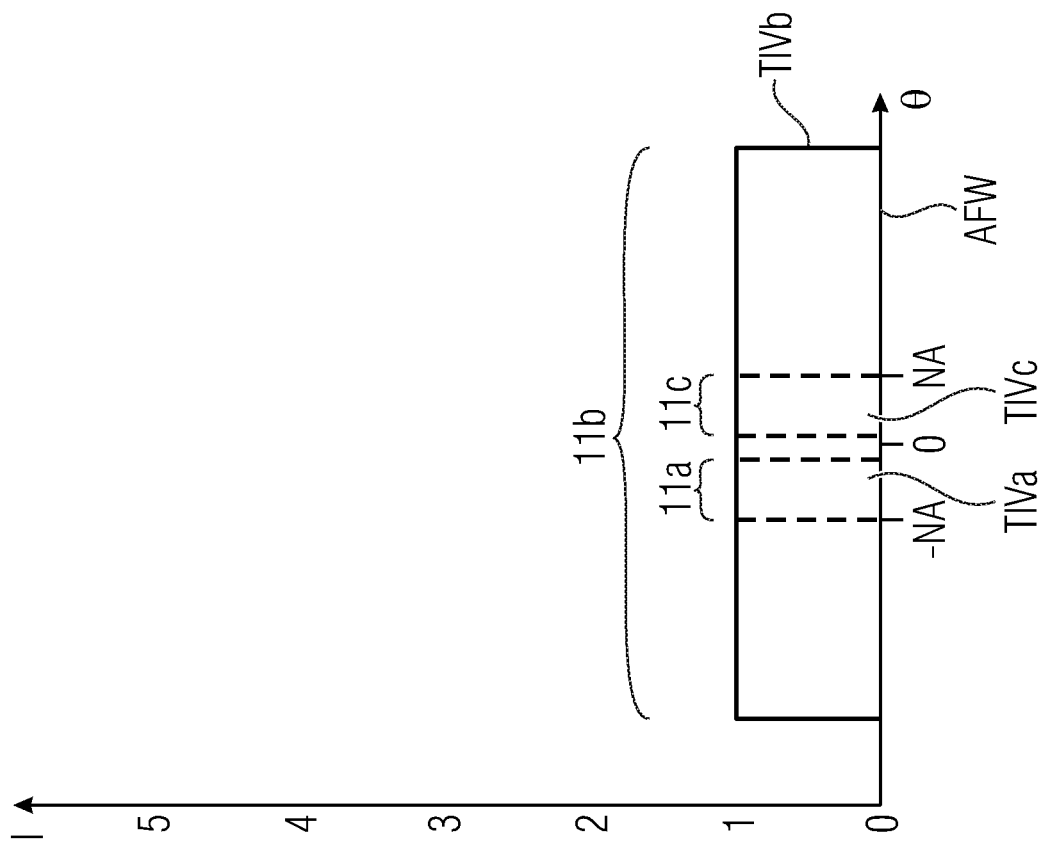
FIG. 11 shows the angle-of-emergence ranges and the partial intensity distributions of the emerging partial light beams of the optical channels of the optical beam former of FIG. 10.

FIG. 11 shows the angle-of-emergence ranges 11*a-c* and the partial intensity distributions TIVa-c of the emerging partial light beams ATLa-c of the optical channels 10*a-c* of the optical beam former 1 of FIG. 10.

Figure 12:
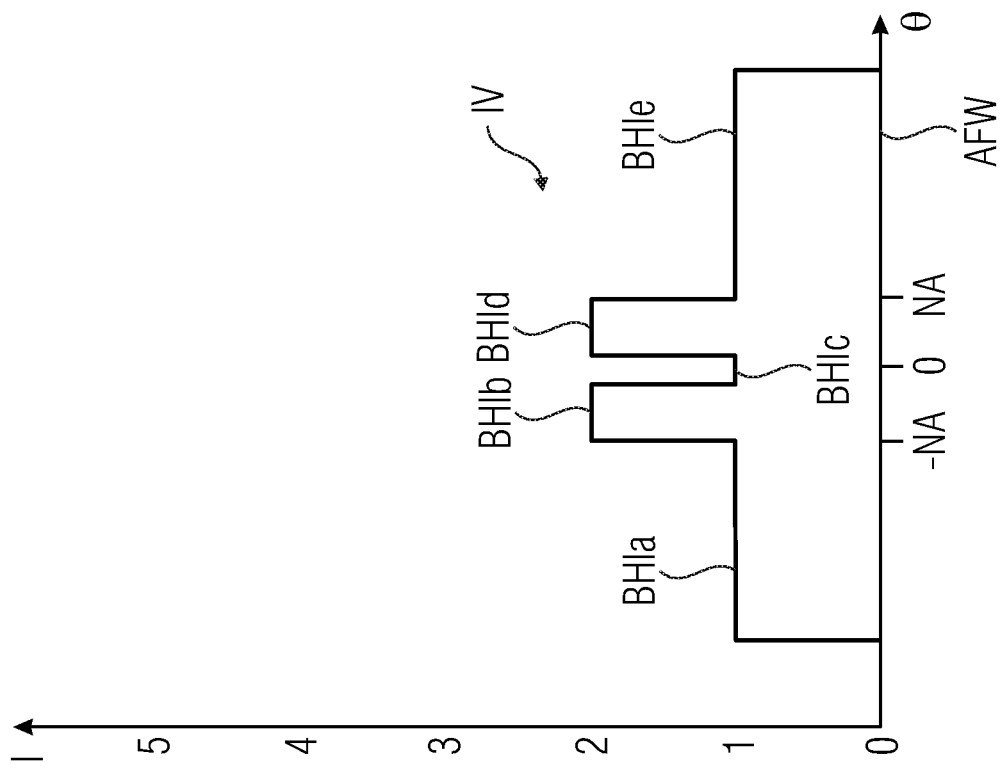
FIG. 12 shows the resulting intensity distribution of the emerging light beam of the optical beam former of FIG. 10.

FIG. 12 shows the resulting intensity distribution IV of the emerging light beam ALB of the optical beam former 1 of FIG. 10.

Figure 13:
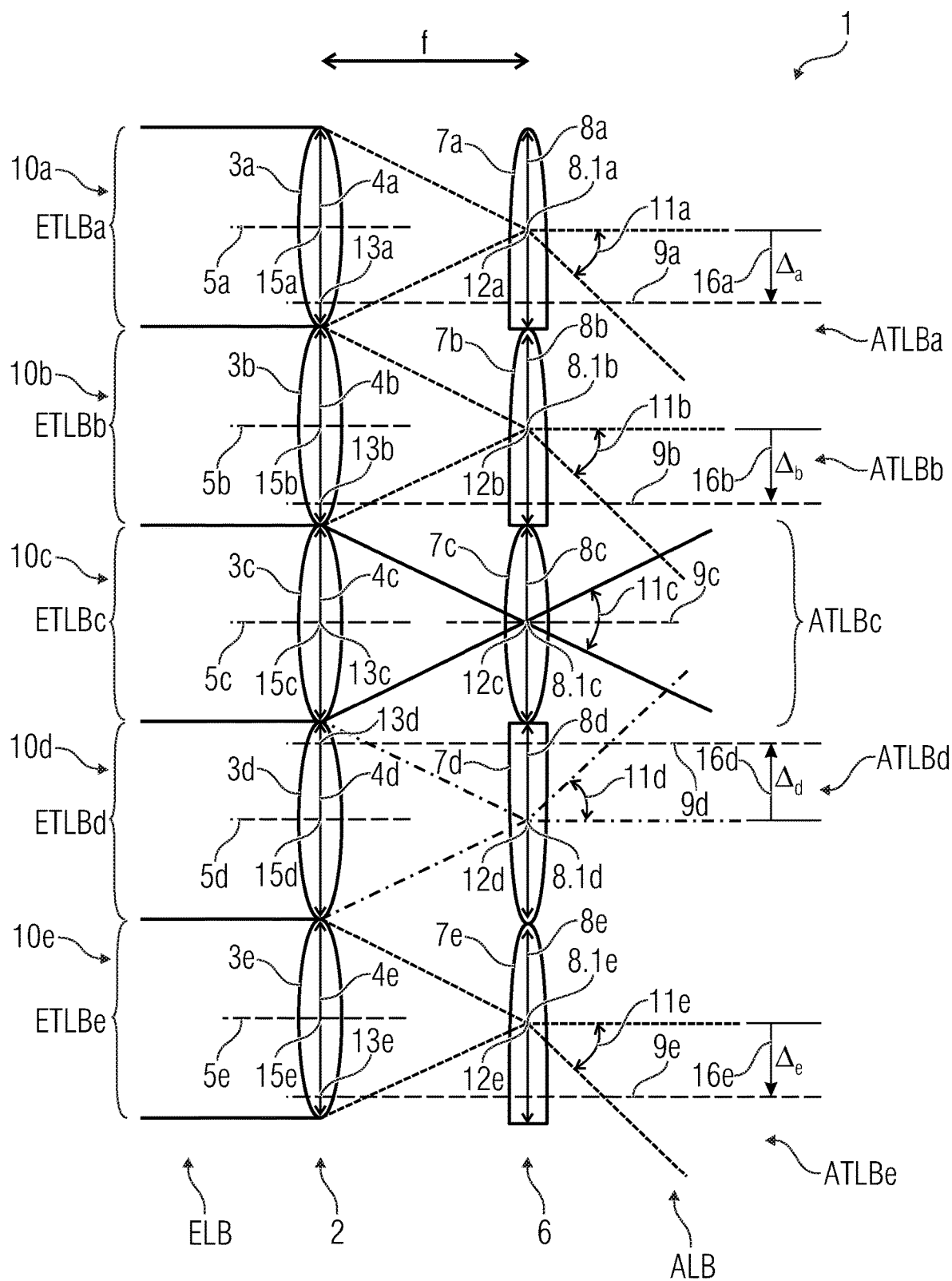
FIG. 13 shows a fourth embodiment of an inventive optical beam former in a schematic sectional side view.

FIG. 13 shows a fourth embodiment of an inventive optical beam former 1 in a schematic sectional side view.

According to an advantageous further development of the invention, the optical axis 9 of the projection lens 7 of one of the optical channels 10 comprises an offset 16 with respect to the center 8.1 of the aperture 8 of the respective projection lens 7.

According to an advantageous further development of the invention, the optical axis 9 of the projection lens 7 of another one of the optical channels 10 does not comprise any offset 14 or comprises a different offset 14 with respect to the center 8.1 of the aperture 8 of the respective projection lens 7.

If Δ indicates the offset 16 of a projection lens 7 of one of the optical channels 10, the respective emerging partial light beam ATLB is inclined with respect to the optical axis 9 of the projection lens 7 about an angle $-\Delta_n/f$ in the paraxial approximation so that a deflection of the respective emerging partial light beam ALTB results through the offset 16, In the embodiment of FIG. 13, the projection lens array 6 comprises projection lenses 7*a*, 7*b*, 7*d* and 7*e*, each having an offset 16*a*, 16*b*, 16*d* and 16*e*, respectively. Therefore, the optical axes 9*a*, 9*b*, 9*d* and 9*e* of the projection lenses 7*a*, 7*b*, 7*d* and 7*e* do not extend in the center of gravity 8.1*a*, 8.1*b*, 8.1*d* and 8.1*e* of the apertures 8*a*, 8*b*, 8*d* and 8*e* of the projections lenses 7*a*, 7*b*, 7*d* and 7*e*. Solely the optical axis 9*c* of the non-offset projection lenses 7*c* extends through the center of gravity 8.1*c* of the aperture 8*c*. In contrast, the condenser lens array 2 solely comprises condenser lenses 3*a-e* that do not have an offset. Therefore, all optical axes 5*a-e* of the condenser lenses 3*a-e* extend in the center of gravity 15*a-e* of the apertures 4*a-e* of the condenser lenses 3*a-e*.

The condense lens array 2 comprises condenser lenses 3*a-e* that each have similar apertures 4*a-e*. Also, the projection lens array 6 comprises projection lenses 7*a-e* that each have the same aperture 8*a-e*.

Here, the numerical aperture NA is also calculated in the paraxial approximation to NA=h/2f from the focal length f and the height h of the projection lenses 7. This corresponds to the angle of acceptance of the classic honeycomb condenser of FIG. 1, so that, in contrast to the classic honeycomb condenser, the independence of the inventive optical beam former from the irradiation direction is not limited.

The projection lens array 6 of FIG. 13 may also be combined with the condenser lens array 2 of FIGS. 4, 7 and 10.

With appropriate combinations of differently sized and possibly also deflecting condenser lenses 3, any intensity distributions IV may be generated in the far field. Optionally, deflecting projection lenses 7 enable a further increase of the divergence of the resulting intensity distribution IV in the far field and an increased flexibility in the design. The resulting beam former 1 obtains the large angle of acceptance and the high transmission of the classic honeycomb condenser.

The angle-of-incidence ranges of the optical channels 10*a* to 10*e* are not drawn in FIG. 13 for the sake of clarity, however, they correspond to the angle-of-incidence ranges of the classic honeycomb condenser shown in FIG. 1.

Figure 14:
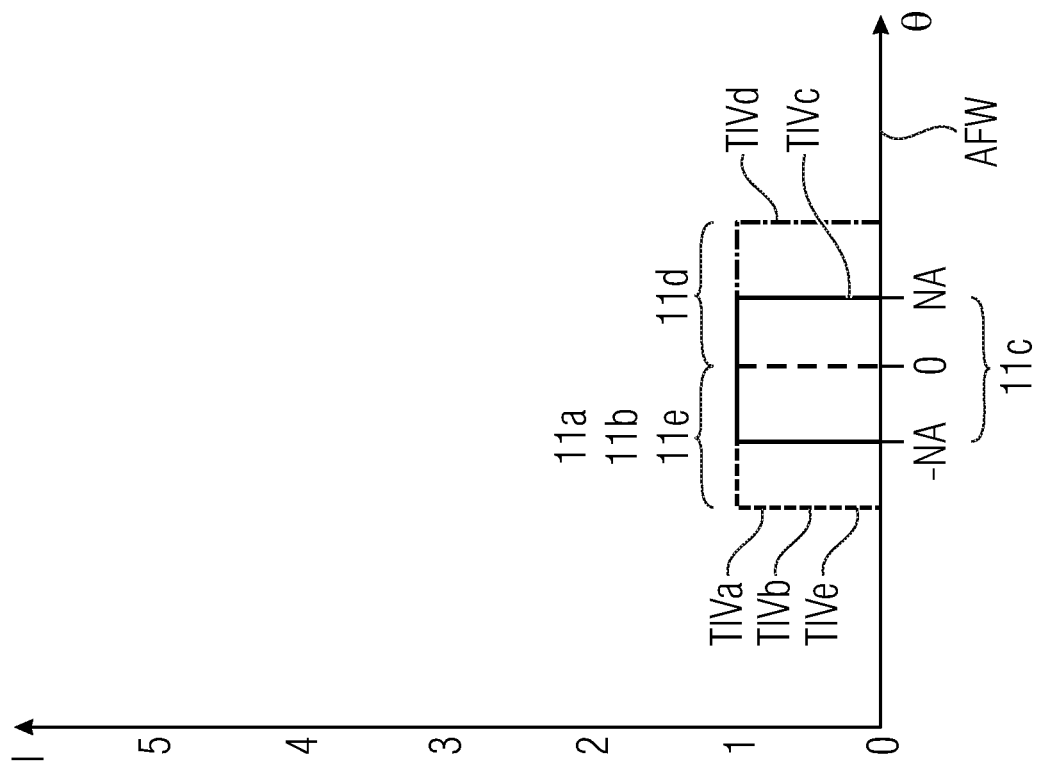
FIG. 14 shows the angle-of-emergence ranges and the partial intensity distributions of the emerging partial light beams of the optical channels of the optical beam former of FIG. 13.

FIG. 14 shows the angle-of-emergence ranges 11 *a-e* and the partial intensity distributions TIVa-e of the emerging partial light beams ATLBa-e of the optical channels 10*a-e* of the optical beam former 1 of FIG. 13.

Figure 15:
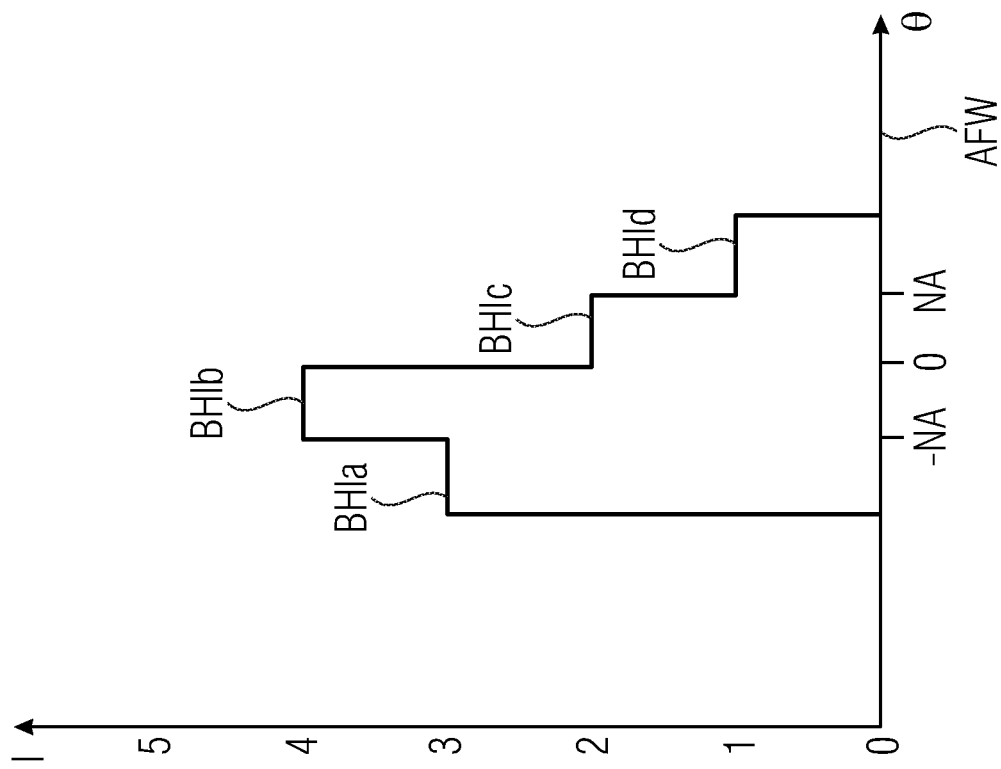
FIG. 15 shows the resulting intensity distribution of the emerging light beam of the optical beam former of FIG. 13.

FIG. 15 shows the resulting intensity distribution IV of the emerging light beam LAB of the optical beam former 1 of the FIG. 13.

Figure 16:
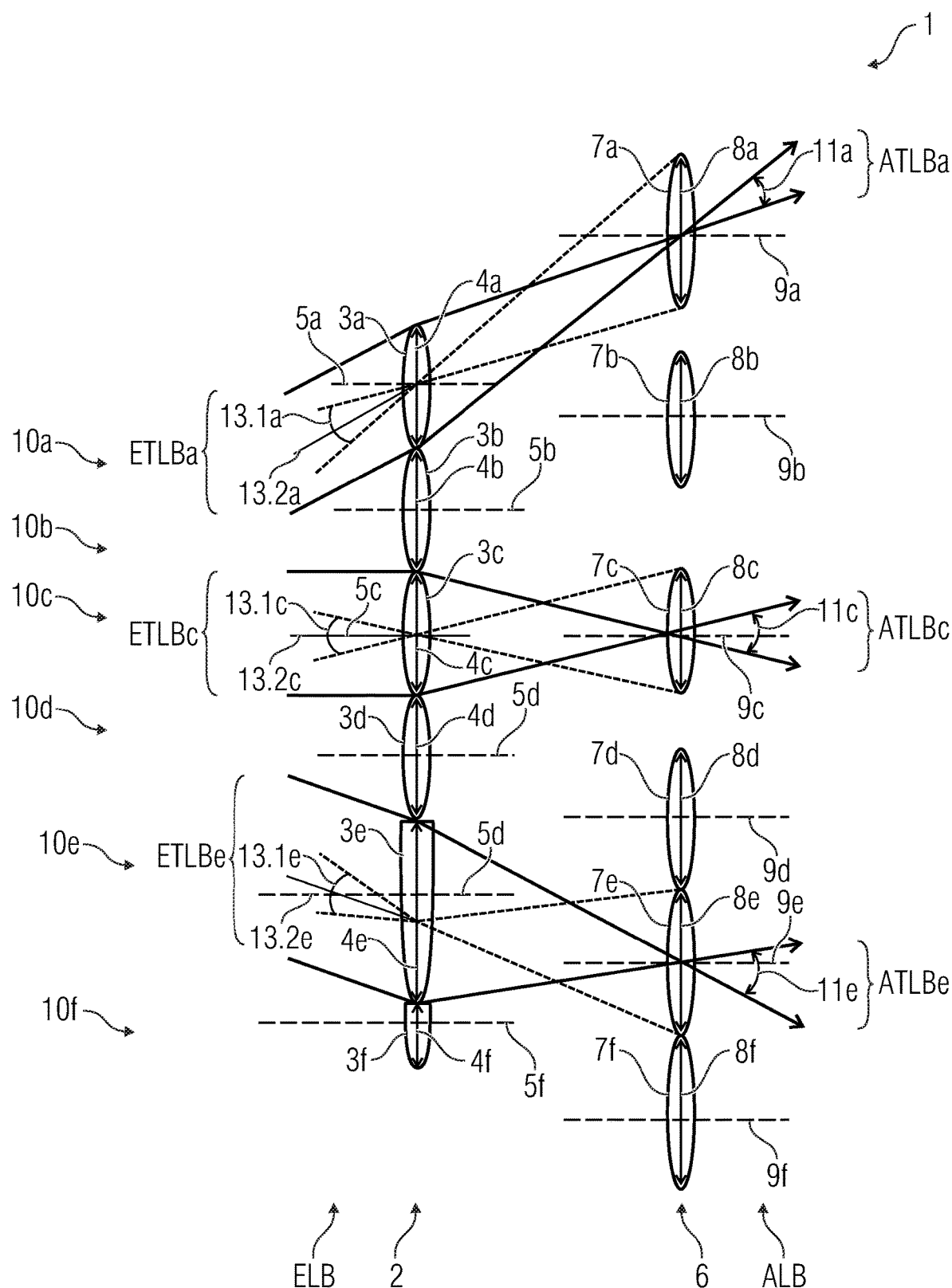
FIG. 16 shows a fifth embodiment of an inventive optical beam former in a schematic sectional side view.

FIG. 16 shows a fifth embodiment of an inventive optical beam former 1 in a schematic sectional side view. For the sake of clarity, the optical paths of the optical channels 10*b*, 10*d* and 10*f* are not illustrated. However, it is essential that the admissible angle-of-incidence ranges 13.1 of all optical channels 10*a* to 10*f* have the same size as to theft magnitude.

According to a further development of the invention, main rays 13.2 of the admissible angle-of-incidence ranges 13.1 extend obliquely with respect to each other at least in some of the optical channels 10. This enables the use of the optical beam former 1 in cases in which at least some of the incident partial light beams ETLB of the incident light beam ELB are incident obliquely with respect to each other.

Thus, in the example of FIG. 16, the incident partial light beams ETLBa, ETLBc and ETLBb extend obliquely with respect to each other. This is accommodated by the fact that the man rays 13.2, 13.2*c* and 13.2*e* also extend obliquely with respect to each other. The main ray 13.2*a* extends in parallel to the incident partial light beam ETLBa, the main ray 13.2c extends in parallel to the incident partial light beam ETLBc and the main ray 13.2e extends in parallel to the incident partial light beam ETLBe.

In this case, it is essential that the magnitudes of the admissible angle-of-incidence ranges 13.1a, 13.1c and 13.1e have the same size even if the admissible angle-of-incidence ranges 13.1a, 13.1c and 13.1e have different directions.

Figure 17:
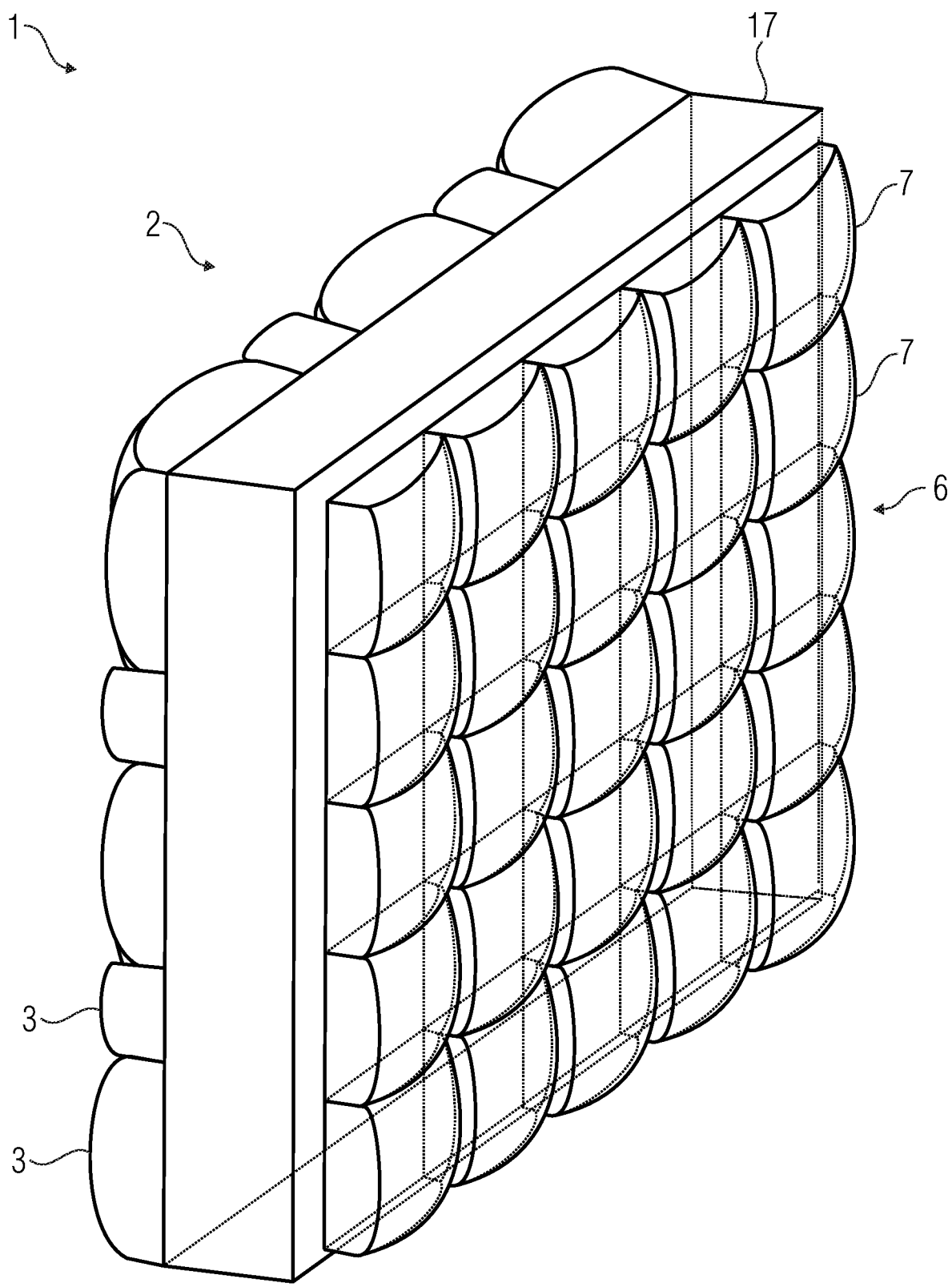
FIG. 17 shows a sixth embodiment of an inventive optical beam former in a schematic spatial oblique view.

FIG. 17 shows a fifth embodiment of an inventive optical beam former 1 in a schematic spatial oblique view. As an example, the projection lenses 7 of the projection lens array 6 are square and horizontally decentered.

Figure 18:
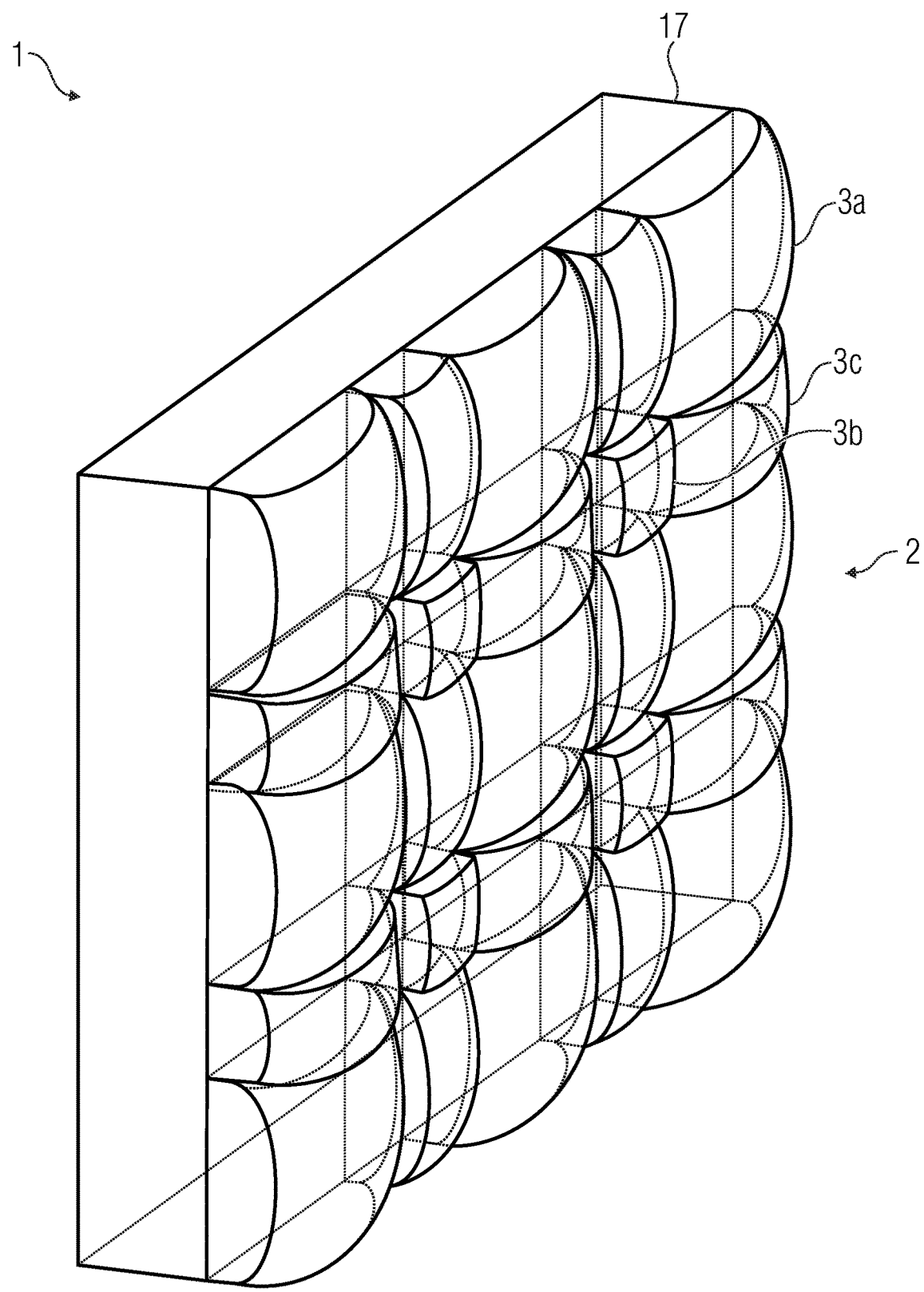
FIG. 18 shows the condenser lens array of the optical beam former of FIG. 17 in a schematic spatial oblique view.

FIG. 18 shows the condenser lens array 6 of the optical beam former 1 of FIG. 17 in a schematic spatial oblique view.

According to a further development of the invention, the condenser lens array 2 is arranged at a first side of a substrate 17 and the projection lens array 6 is arranged at a second opposite side of the substrate 17.

According to a functional further development of the invention, the condenser lenses 3 of the condenser lens array 2 include rectangular and square condenser lenses 3, whereas the projection lenses 7 of the projection lens array 6 includes square or rectangular projection lenses 7.

According to a further development of the invention, the condenser lens 3 having the smaller aperture 4 comprises in the direction of its optical axis 9 a smaller extension than the condenser lens 3 having the larger aperture 4.

The projection lenses 7 of the projection lens array 6 are configured to be square and are arranged regularly, i.e. in a chess board-like manner. All of the projection lenses 7 are configured to be identical and therefore comprise a same focal length and a same thickness. Such a projection lens array 6 comprises a high filling coefficient and is particularly easy to manufacture.

The condenser lenses 3 of the condenser lens array 2 include square condenser lenses 3a having a larger aperture, square condenser lenses 3b having a smaller aperture, and rectangular condenser lenses 3c whose longer side is adjacent to a side of one of the condenser lenses 3a and whose shorter side is adjacent to a side of one of the condenser lenses 3b. The thickness of the condenser lenses 3a, 3b and 3c is identical. Such a condenser lens array 2 may also be manufactured in a comparably easy way since all lenses 3 comprise a same curvature at their outer surfaces. However, at the edges of the condenser lenses 3. In particular at the edges of the smaller square condenser lenses 3b and at the edges of the rectangular condenser lenses 3c, there are interfering slopes that could lead to undesired stray light which, on the one hand, decreases the transmission of the optical beam former 1 and, on the other hand, may uncontrollably overlap the intensity distribution IV in the far field. In order to avoid this, the smaller condenser lenses 3b and 3c may be configured with a smaller thickness in comparison to the larger condenser lenses 3a. In order to avoid aberrations and in order to avoid a decrease of the angle of acceptance, which could both occur due to the fact that the smaller thickness leads to the respective condenser lens 3b and 3c being closer to the respective projection lenses, the curvature of the outer surfaces of the condenser lenses 3b and 3c may have to be adapted. The curvature of the respectively assigned projection lens 7 may also have to be adapted. In many cases, the defocusing arising due to the smaller thickness may also be neglected. In typical numerical apertures NA≤0,2, this effect may be neglected. If a significant interference should occur in higher numerical apertures, the curvature of the concerned condenser lenses 3 may be adapted in order to achieve an ideally focused image of the source on the assigned projection lenses 7. For this, least-squares optimization methods that are conventional in optical design may be used.

Undesired interfering slopes may also occur in decentered condenser lenses or in decentered projection lenses 7. However, since the divergence of the irradiation is smaller in regular operation than the angle of acceptance of the beam former 1, there are no light portions of the interfering slopes of the projection array. Thus, this case is not critical in practice.

Figure 19:
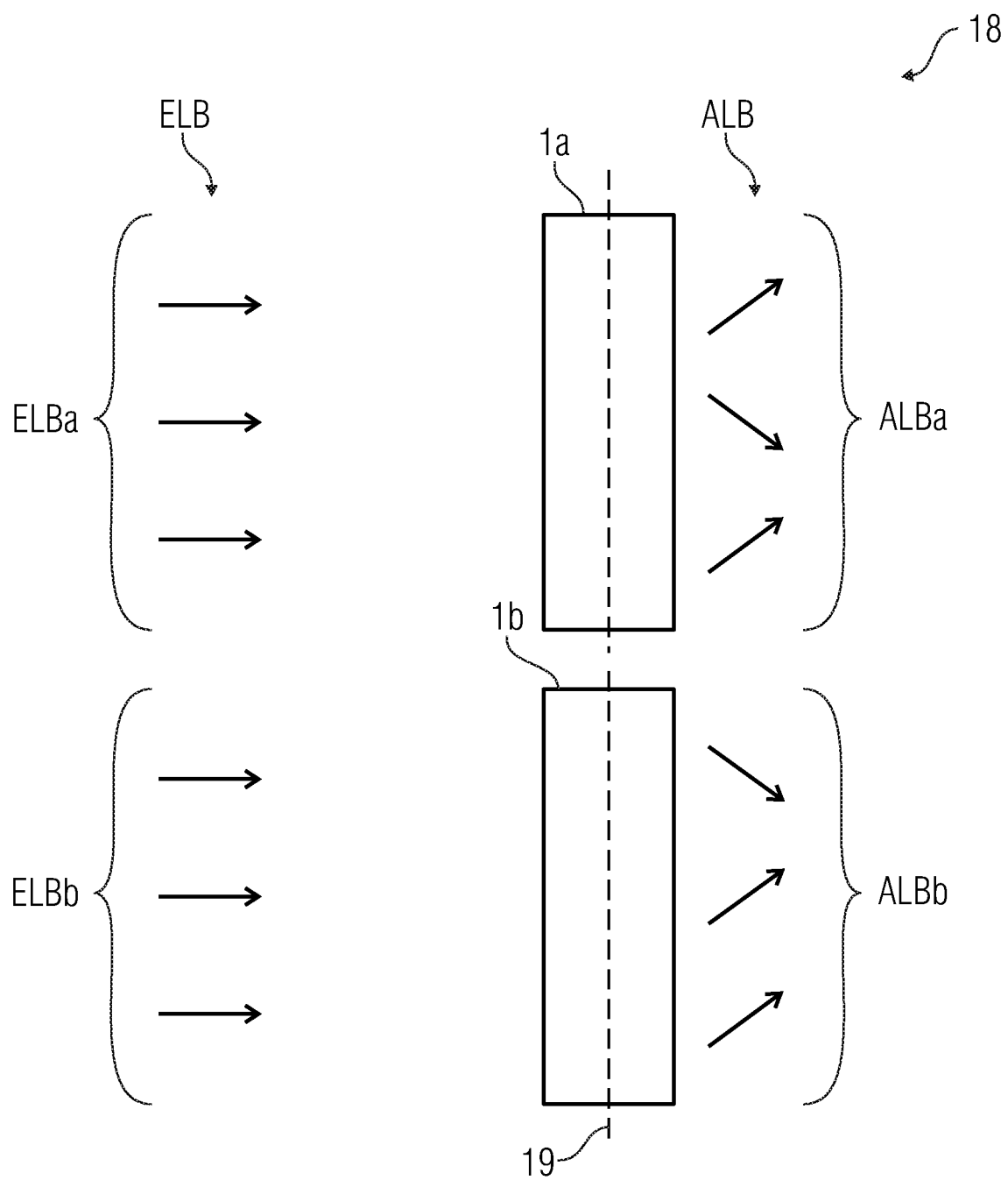
FIG. 19 shows a first embodiment of an inventive optical beam former arrangement in a schematic side view.

FIG. 19 shows a first embodiment of an inventive optical beam former arrangement 18 in a schematic side view.

The optical beam former arrangement 18 for generating an emerging light beam ALB from an incident light beam ELB comprises a first inventive optical beam former 1a and a second inventive optical beam former 1b, wherein the first optical beam former 1a and the second optical beam former 1b are arranged along a mutual plane 19 and wherein the intensity distribution IV of the first optical beam former 1a and the intensity distribution IV of the second optical beam former 1b are different.

The incident light beam ELB of the beam former arrangement 18 consists of the incident light beam ELBa of the first optical beam former 1a and of the incident light beam ELBb of the second optical beam former 1b. The incident light beam ELBa of the first optical beam former and the incident light beam ELBb of the second optical beam former 1b may originate from a same light source. The intensity distribution of the emerging light beam ALB of the optical beam former arrangement 18 results from the overlap of the intensity distribution IV of the emerging light beam ALBa of the first optical beam former 1a and the intensity distribution of the emerging light beam ALBb of the second beam former 1b.

Figure 20:
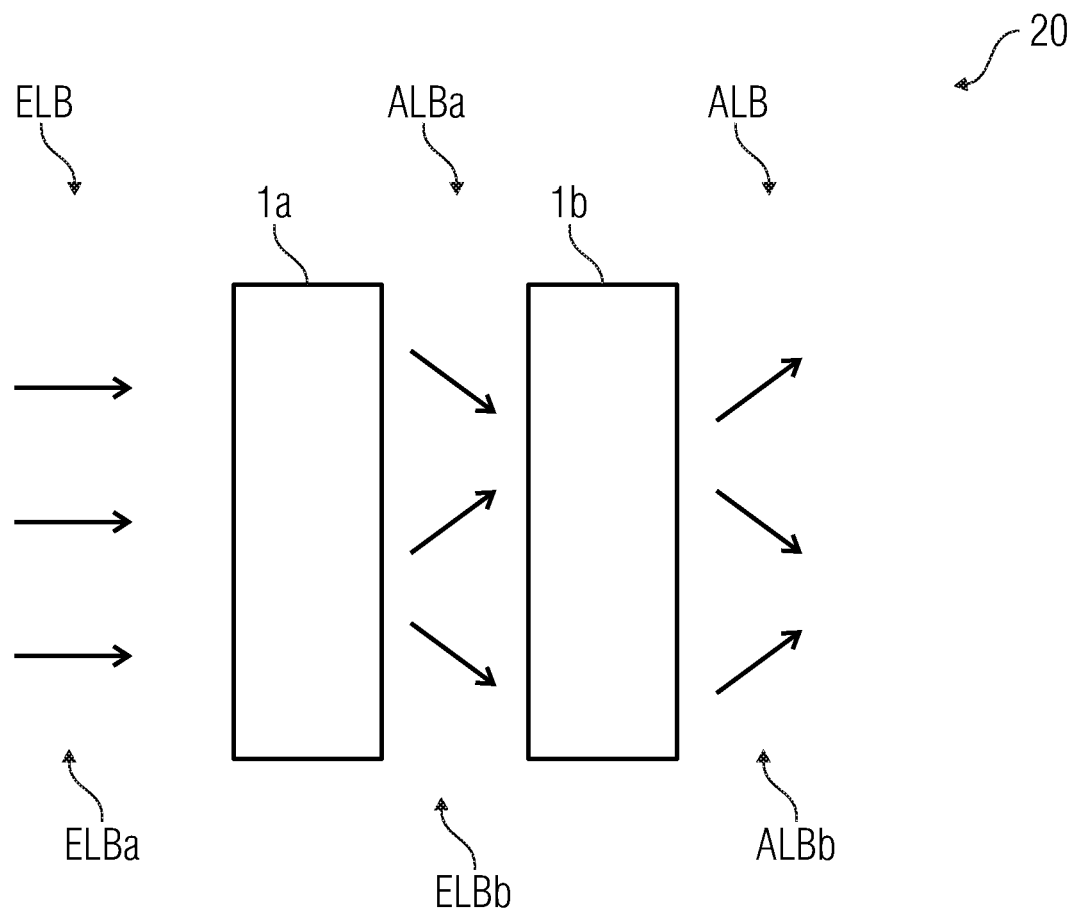
FIG. 20 shows a second embodiment of an inventive optical beam former arrangement in a schematic side view.

FIG. 20 shows a second embodiment of an inventive optical beam former arrangement 20 in a sectional side view.

The optical beam former arrangement for generating an emerging light beam ALB from an incident light beam ELB comprises a first inventive optical beam former 1a and a second inventive optical beam former 1b, wherein the first optical beam former 1a and the second optical beam former 1b are arranged such that at least a part of the emerging light beam ALBa of the first optical beam former 1a is supplied to the second optical beam former 1b as its incident light beam ELBb.

The incident light beam ELBa of the first optical beam former 1a is at the same time the incident light beam ELB of the beam former arrangement 20. In addition, the emerging light beam ALBb of the second optical beam former 1b is simultaneously the emerging light beam ALB of the beam former arrangement 20.

Figure 21:
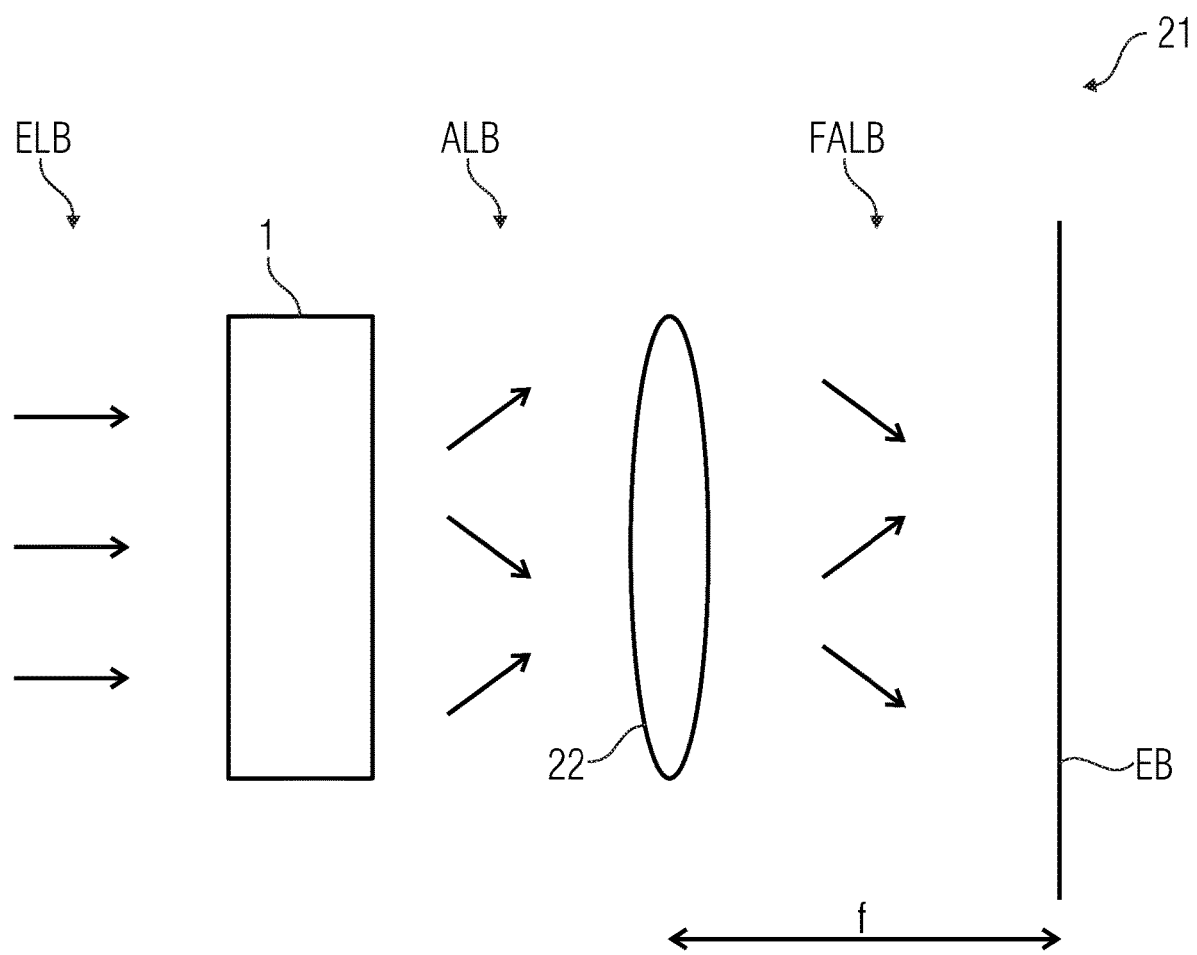
FIG. 21 shows a first embodiment of an inventive optical system in a schematic side view.

FIG. 21 shows a first embodiment of an inventive optical system 21 in a schematic side view.

The optical system 21 for generating a focused emerging light beam FALB from an incident light beam ELB comprises an inventive optical beam former 1 and a collecting optic 22 for focusing the emerging light beam ALB of the optical beam former 1 onto a plane EB.

In a non-depicted second embodiment, the optical system 21 for generating an emerging light beam FALB from an incident light beam ELB comprises an inventive optical beam former arrangement 19, 20 and a collecting optic 22 for focusing the emerging light beam ALB of the optical beam former arrangement onto a plane EB.

A combination of the optical beam former 1, or the optical beam former arrangement 19, 20, with a focusing lens 22 enables a transformation of the angular intensity distribution into a plane illumination intensity distribution (luminance) with several homogeneous regions having different illumination intensities in the focal plane of this lens 22.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCE NUMERALS

1 Optical beam former
2 Condenser lens array
3 Condenser lens
4 Aperture of a condenser lens
5 Optical axis of a condenser lens
6 Projection lens array
7 Projection lens
8 Aperture of a projection lens
8.1 Center of an aperture of a projection lens
9 Optical axis of a projection lens
10 Optical channel
11 Angle-of-emergence range
12 Focal point of a condenser lens
13 Focal point of a projection lens
13.1 Admissible angle-of-incidence range of an optical channel
13.2 Main ray of the admissible angle-of-incidence range
14 Offset between an optical axis of a condenser lens and a center of the aperture of the condenser lens
15 Center of an aperture of a condenser lens
16 Offset between an optical axis of a projection lens and a center of an aperture of the projection lens
17 Substrate
18 Beam former arrangement
19 Mutual plane
20 Beam former arrangement
21 Optical system
22 Collecting optic
ALB Emerging light beam
ELB Incident light beam
AFW Angle of emergence
IV intensity distribution
BHI Region having a homogeneous intensity
ETLB incident partial light beam
TIV Partial intensity distribution
ATLB Emerging partial light beam
EB Plane
FALB Focus emerging light beam

SOURCES

[1] Enrico Geißler, "Meeting the Challenges of Developing LED-based Projection Displays", SPIE 6169 (2006) 619601.
[2] Peter Schreiber, Sergey Kudaev, Peter Dannberg, Uwe D. Zeitner, "Homogeneous LED-illumination using microlens arrays", SPIE 5942 (2005) 188-96.
[3] Julius Muschaweck, "Randomized Micro Lens Arrays for Color Mixing", SPIE 7954 (2011) 79540A.
[4] Marcel Sieler, Peter Schreiber, Peter Dannberg, Andreas Bräuer, Andreas Tünnermann, "Ultraslim fixed pattern projectors with inherent homogenization of illumination", Appl. Opt. 51 (2012) 64-74.

The invention claimed is:

1. An optical beam former for generating an emerging light beam from an incident light beam, the optical beam former comprising:
a condenser lens array for receiving the incident light beam, comprising several condenser lenses, wherein the condenser lenses each comprise an aperture and an optical axis, wherein the optical axes of the condenser lenses extend in parallel to each other; and
a projection lens array for radiating the emerging light beam, arranged in parallel to the condenser lens array and comprising several projection lenses, wherein the projection lenses each comprise an aperture with a center, and an optical axis;
wherein exactly one of the projection lenses is assigned to each of the condenser lenses so that each of the condenser lenses and the respectively assigned projection lens form an optical channel of several optical channels and so that each of the several optical channels generates a partial light beam of the emerging light beam, said partial light beam emerging in an angle-of-emergence range with a partial intensity distribution that is homogenous with respect to an angle of emergence, from a partial light beam of the incident light beam, said partial light beam being incident within an admissible angle-of-incidence range of the respective optical channel, wherein the admissible angle-of-incidence ranges of the optical channels comprise the same size as to their magnitude in a plane extending in parallel to the optical axes of the condenser lenses; and
wherein the angle-of-emergence ranges of at least two of the optical channels are different so that an intensity distribution with respect to the angle of emergence comprises in a far field of the emerging light beam several regions comprising a homogenous intensity.

2. The optical beam former according to claim 1, wherein the apertures of the projection lenses are of the same type.

3. The optical beam former according to claim 1, wherein main rays of the admissible angle-of-incidence ranges extend in parallel at least in some of the optical channels.

4. The optical beam former according to claim 1, wherein main rays of the admissible angle-of-incidence ranges extend in parallel to the optical axes of the condenser lenses at least in some of the optical channels.

5. The optical beam former according to claim 1, wherein main rays of the admissible angle-of-incidence ranges extend obliquely with respect to each other at least in some of the optical channels.

6. The optical beam former according to claim 1, wherein, in each of the several optical channels, a focal point of the respective condenser lens in the direction of the optical axis of the respective condenser lens is located in a region of the projection lenses, and a focal point of the respective projection lens in the direction of the optical axis of the respective projection lens is located in a region of the condenser lenses.

7. The optical beam former according to claim 1, wherein at least two of the different angle-of-emergence ranges overlap each other.

8. The optical beam former according to claim 1, wherein, in each of the optical channels, the optical axis of the respective condenser lens is equal to the optical axis of the respective projection lens.

9. The optical beam former according to claim 1, wherein the aperture of the condenser lens of one of the optical channels is larger than the apertures of the projection lenses, and wherein the aperture of the condenser lens of another one of the optical channels is smaller than the apertures of the projection lenses.

10. The optical beam former according to claim 1, wherein the condenser lenses of the condenser lens array comprise rectangular and square condenser lenses, and wherein the projection lenses of the projection lens array comprise square or rectangular projection lenses.

11. The optical beam former according to claim 9, wherein the condenser lens with the smaller aperture comprises a smaller extension in the direction of its optical axis than the condenser lens with the larger aperture.

12. The optical beam former according to claim 1, wherein the optical axis of the condenser lens of one of the optical channels comprises an offset with respect to a center of the aperture of the respective condenser lens.

13. The optical beam former according to claim 1, wherein the optical axis of the condenser lens of another one of the optical channels does not comprise an offset or comprises a different offset with respect to the center of the aperture of the respective condenser lens.

14. The optical beam former according to claim 12, wherein the apertures of the condenser lenses of the condenser lens array are arranged in a regularly hexagonal manner and are configured in the same way with a round or hexagonal shape, and wherein the apertures of the projection lenses of the projection lens array are arranged in a regularly hexagonal manner and are configured with a round or hexagonal shape.

15. The optical beam former according to claim 1, wherein the optical axis of the projection lens of one of the optical channels comprises an offset with respect to the center of the aperture of the respective projection lens.

16. The optical beam former according to claim 1, wherein the optical axis of the projection lens of another one of the optical channels does not comprise an offset or comprises a different offset with respect to the center of the aperture of the respective projection lens.

17. The optical beam former according to claim 1, wherein the condenser lens ray is arranged at a first side of a substrate and wherein the projection lens is arranged at a second opposite side of the substrate.

18. The optical beam former according to claim 1, wherein, in each of the optical channels, the respective condenser lens focuses the respective incident partial light beam onto the center of the aperture of the respective projection lens if the respective incident partial light beam is incident in parallel to the optical axis of the respective condenser lens.

19. The optical beam former according to claim 1, wherein, in each of the optical channels, the respective condenser lens focuses the respective incident partial light beam onto the center of the aperture of the respective projection lens if the respective incident partial light beam is incident at an angle with respect to the optical axis of the respective condenser lens.

20. An optical beam former arrangement for generating an emerging light beam from an incident light beam, wherein the beam former arrangement comprises first and second optical beam formers according to claim 1, wherein the first optical beam former and the second optical beam former are arranged along a mutual plane, and wherein the intensity distribution of the first optical beam former and the intensity distribution of the second optical beam former are different.

21. An optical beam former arrangement for generating an emerging light beam from an incident light beam, wherein the beam former arrangement comprises first and second optical beam formers according to claim 1, wherein the first optical beam former and the second optical beam former are arranged such that at least a part of the emerging light beam of the first optical beam former is provided to the second optical beam former as its incident light beam.

22. An optical system for generating a focused emerging light beam from an incident light beam, wherein the optical system comprises an optical beam former according to claim 1 and a collecting optic for focusing the emerging light beam of the optical beam former onto a plane.

23. An optical system for generating a focused emerging light beam from an incident light beam, wherein the optical system comprises an optical beam former according to claim 1 and a diverging optic for increasing a divergence of the emerging light beam of the optical beam former.

24. An optical system for generating an emerging light beam from an incident light beam, wherein the optical system comprises an optical beam former arrangement according to claim 20 and a collecting optic for focusing the emerging light beam of the optical beam former arrangement onto a plane.

25. An optical system for generating an emerging light beam from an incident light beam, wherein the optical system comprises an optical beam former arrangement according to claim 20 and a diverging optic for increasing a divergence of the emerging light beam of the optical beam former arrangement.

\* \* \* \* \*